US012666135B2

(12) United States Patent
Shinohara

(10) Patent No.: US 12,666,135 B2
(45) Date of Patent: Jun. 23, 2026

(54) IMAGE MANAGEMENT SYSTEM, IMAGE CAPTURING DEVICE, IMAGING PROCESSING METHOD, AND NON-TRANSITORY COMPUTER-EXECUTABLE MEDIUM

(71) Applicant: PFU Limited, Ishikawa (JP)

(72) Inventor: Kohki Shinohara, Kanagawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 18/770,774

(22) Filed: Jul. 12, 2024

(65) Prior Publication Data

US 2025/0039536 A1      Jan. 30, 2025

(30) Foreign Application Priority Data

Jul. 24, 2023      (JP) ................................. 2023-120028

(51) Int. Cl.
| | |
|---|---|
| *H04N 23/63* | (2023.01) |
| *G06T 5/70* | (2024.01) |
| *H04N 23/62* | (2023.01) |
| *H04N 23/698* | (2023.01) |

(52) U.S. Cl.
CPC ............. *H04N 23/632* (2023.01); *G06T 5/70* (2024.01); *H04N 23/62* (2023.01); *H04N 23/698* (2023.01)

(58) Field of Classification Search
CPC .... H04N 23/632; H04N 23/698; H04N 23/62; G06T 5/70
USPC ...................................................... 348/333.11
See application file for complete search history.

(56) References Cited

U.S. PATENT DOCUMENTS

2023/0119757 A1*  4/2023  Mate .................... H04N 13/366
                                                        348/14.07
2023/0186534 A1*  6/2023  Doken ...................... G06T 9/00
                                                        345/633

FOREIGN PATENT DOCUMENTS

| JP | 2006-050284 A | 2/2006 |
|---|---|---|
| JP | 2013-232830 A | 11/2013 |
| JP | 2015-072539 A | 4/2015 |
| JP | 2019-219736 A | 12/2019 |
| JP | 2020-021346 A | 2/2020 |
| JP | 2022-055709 A | 4/2022 |

* cited by examiner

*Primary Examiner* — Joel W Fosselman
(74) *Attorney, Agent, or Firm* — IPUSA, PLLC

(57) ABSTRACT

An image management system includes an image capturing device, the image capturing device including first circuitry. The first circuitry acquires a captured image of a local site where the image capturing device is provided, the captured image being an image of surroundings around the image capturing device. The first circuitry receives a setting of a particular display mode in which the captured image is to be displayed. The first circuitry generates preview screen data representing a preview screen of a processed image obtained by performing predetermined processing on the captured image, based on the particular display mode and an image processing setting file for performing the predetermined processing on the captured image. The first circuitry transmits the preview screen data for display at a first terminal at another site where the captured image of the local site is shared.

20 Claims, 32 Drawing Sheets

IMAGE DISPLAY SYSTEM 1

FIG. 2B

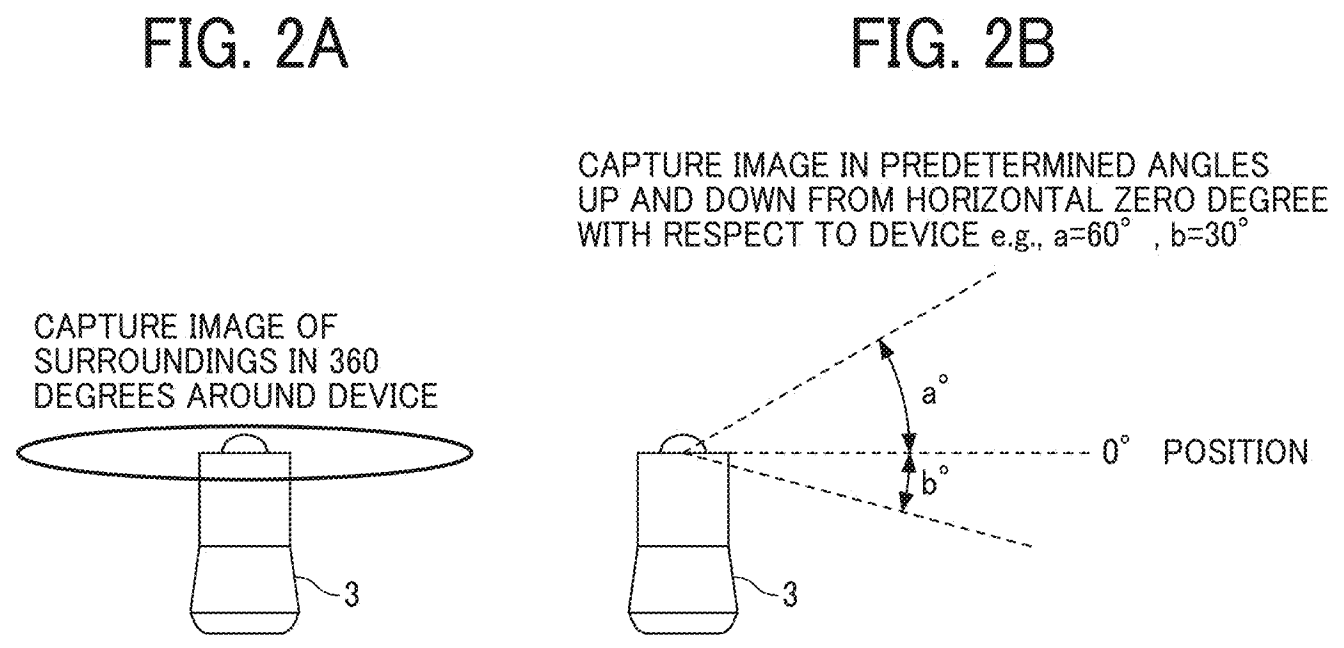

CAPTURE IMAGE IN PREDETERMINED ANGLES
UP AND DOWN FROM HORIZONTAL ZERO DEGREE
WITH RESPECT TO DEVICE e.g., a=60° , b=30°

0°  POSITION a° b°

CAPTURE IMAGE OF
SURROUNDINGS IN 360
DEGREES AROUND DEVICE

| FIG. 4A |
|---|
| FIG. 4B |

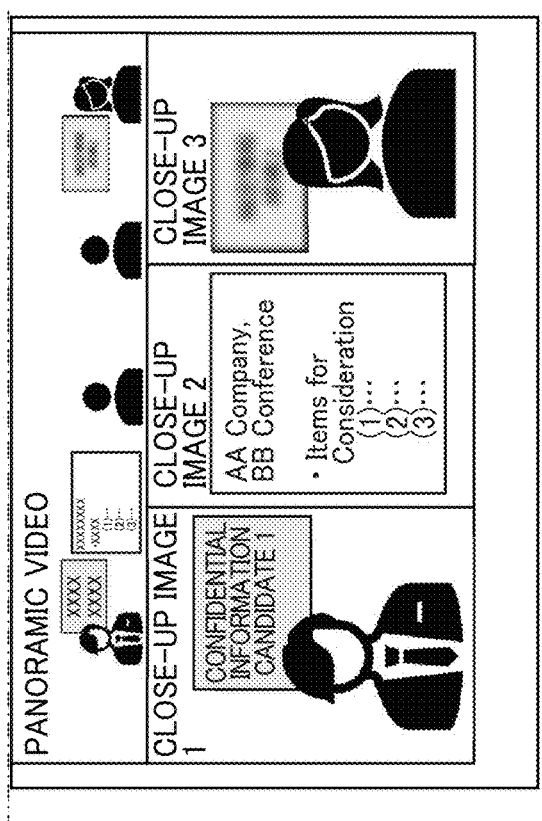
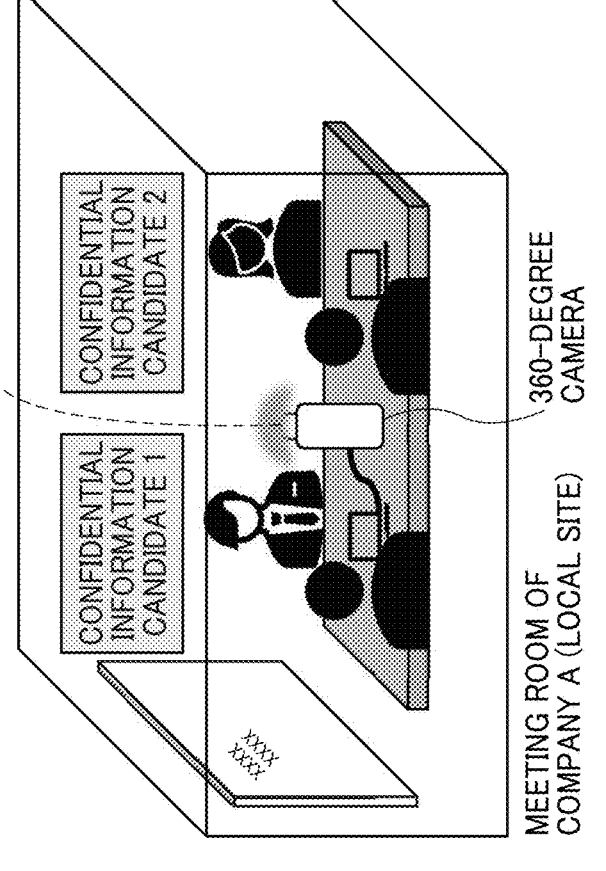
FIG. 4B

RECEIVED IMAGE AT REMOTE SITE (PATTERN 1)

RECEIVED IMAGE AT REMOTE SITE (PATTERN 3)

IMAGE DISPLAY SYSTEM 1

FIG. 10B

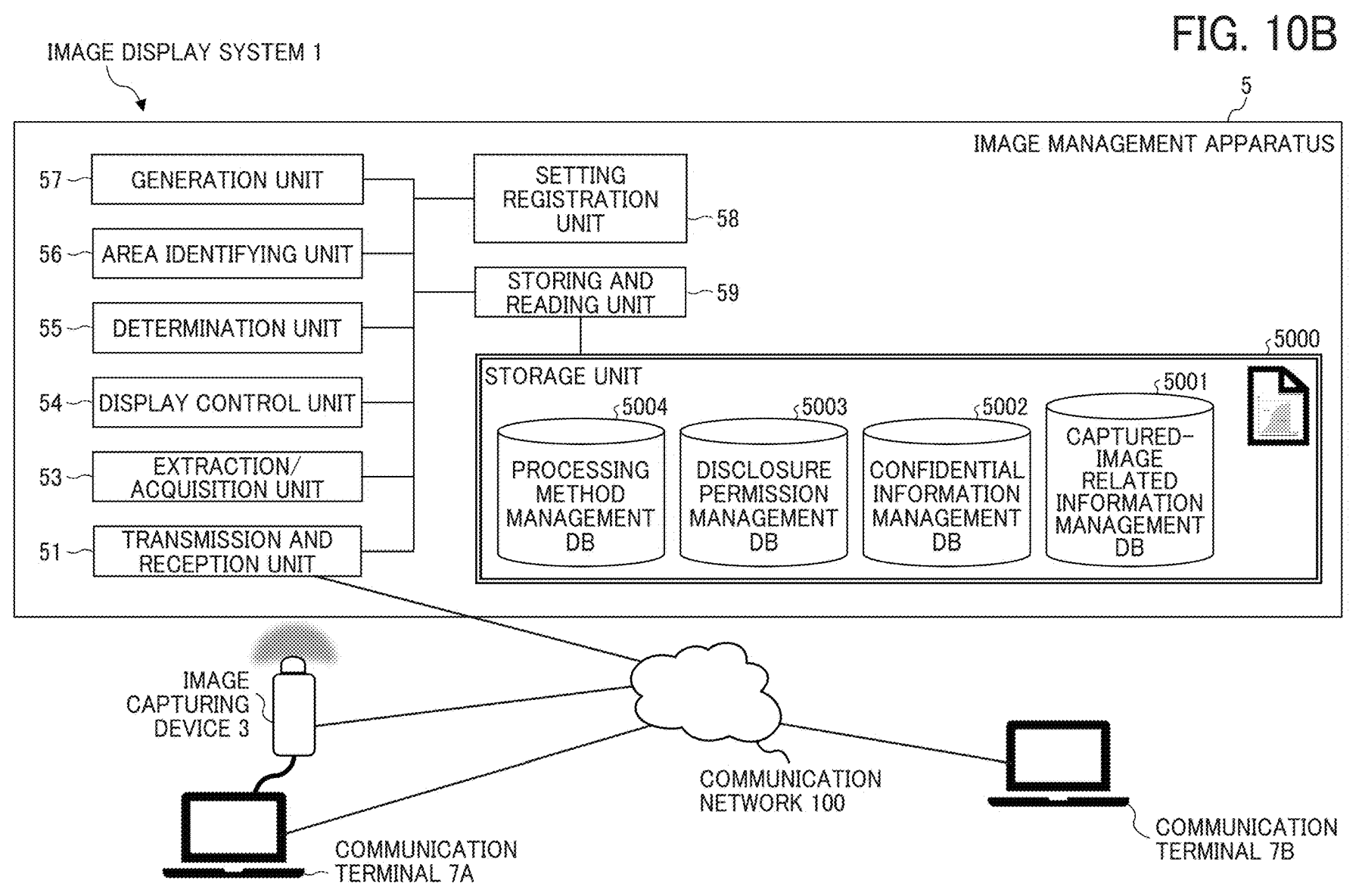

IMAGE DISPLAY SYSTEM 1

IMAGE MANAGEMENT APPARATUS　5

5000

5001 — CAPTURED-IMAGE RELATED INFORMATION MANAGEMENT DB

5002 — CONFIDENTIAL INFORMATION MANAGEMENT DB

5003 — DISCLOSURE PERMISSION MANAGEMENT DB

5004 — PROCESSING METHOD MANAGEMENT DB

STORAGE UNIT

58 — SETTING REGISTRATION UNIT

59 — STORING AND READING UNIT

57 — GENERATION UNIT

56 — AREA IDENTIFYING UNIT

55 — DETERMINATION UNIT

54 — DISPLAY CONTROL UNIT

53 — EXTRACTION/ACQUISITION UNIT

51 — TRANSMISSION AND RECEPTION UNIT

COMMUNICATION NETWORK 100

IMAGE CAPTURING DEVICE 3

COMMUNICATION TERMINAL 7A

COMMUNICATION TERMINAL 7B

FIG. 11

IMAGE CAPTURING DEVICE INFORMATION MANAGEMENT TABLE

| IMAGE CAPTURING DEVICE ID | IMAGE CAPTURING DEVICE NAME | IMAGE CAPTURING DEVICE INFORMATION (PERFORMANCE INFORMATION) | |
|---|---|---|---|
| | | RESOLUTION [dpi] | |
| C0001 | 360-DEGREE CAMERA 1 | 600 | · · · |
| C0002 | PANORAMIC CAMERA 2 | 1200 | · · · |
| C0003 | 360-DEGREE CAMERA 3 | 1200 | · · · |
| · · · | · · · | · · · | · · · |

FIG. 12

CAPTURED-IMAGE INFORMATION MANAGEMENT TABLE

IMAGE CAPTURING DEVICE ID: C0003 (RESOLUTION: 1200 dpi)

IMAGE CAPTURING DEVICE ID: C0001 (RESOLUTION: 600 dpi)

| CAPTURED IMAGE ID | IMAGE CAPTURING DATE AND TIME | CAPTURED IMAGE DATA | DISTANCE INFORMATION (PHOTOGRAPHING DISTANCE [m]) | |
|---|---|---|---|---|
| I0001 | 2023/7/5 10:01:30 | WHITEBOARD IMAGE | 1.4 | |
| | | WALL IMAGE 1 | 1.8 | |
| | | WALL IMAGE 2 | 2.5 | |
| · · · | · · · | · · · | · · · | |

FIG. 13

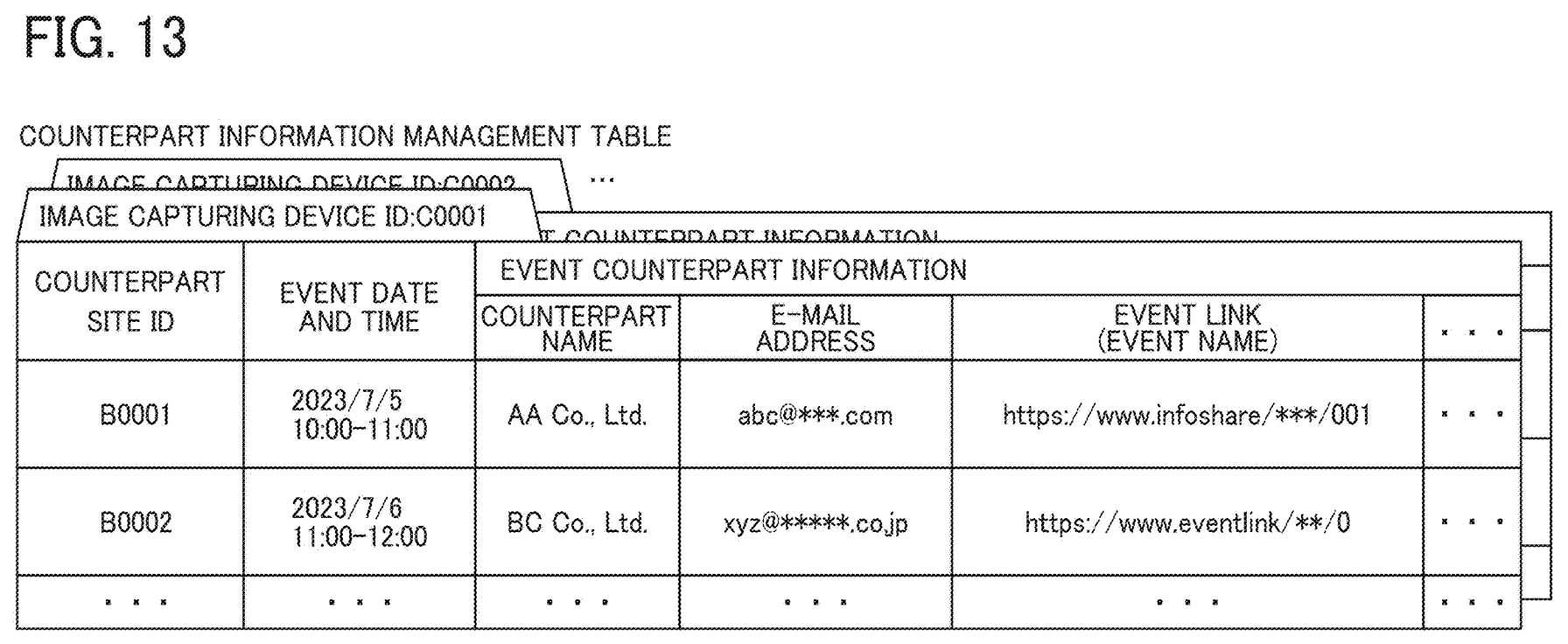

COUNTERPART INFORMATION MANAGEMENT TABLE

IMAGE CAPTURING DEVICE ID:C0002 ...

IMAGE CAPTURING DEVICE ID:C0001

| COUNTERPART SITE ID | EVENT DATE AND TIME | EVENT COUNTERPART INFORMATION | | | |
|---|---|---|---|---|---|
| | | COUNTERPART NAME | E-MAIL ADDRESS | EVENT LINK (EVENT NAME) | |
| B0001 | 2023/7/5 10:00–11:00 | AA Co., Ltd. | abc@*.com | https://www.infoshare/*/001 | ⋮ |
| B0002 | 2023/7/6 11:00–12:00 | BC Co., Ltd. | xyz@***.co.jp | https://www.eventlink//0 | ⋮ |
| ⋮ | ⋮ | ⋮ | ⋮ | ⋮ | ⋮ |

FIG. 14

CAPTURED IMAGE INFORMATION MANAGEMENT TABLE

IMAGE CAPTURING DEVICE ID:
IMAGE CAPTURING DEVICE ID:
C0001 (RESOLUTION: 600 dpi)

| CAPTURED IMAGE ID | IMAGE CAPTURING DATE AND TIME | CONFIDENTIAL INFORMATION CANDIDATE ID | CAPTURED IMAGE DATA | DISTANCE INFORMATION (PHOTOGRAPHING DISTANCE [m]) |
|---|---|---|---|---|
| I0001 | 2023/7/5 10:01:30 | S0001 | WHITEBOARD IMAGE | 1.4 |
| | | S0002 | WALL IMAGE 1 | 1.8 |
| | | S0003 | WALL IMAGE 2 | 2.5 |
| ... | ... | ... | ... | ... |

FIG. 15

CONFIDENTIAL INFORMATION MANAGEMENT TABLE

CONFIDENTIAL INFORMATION CANDIDATE

CONFIDENTIAL INFORMATION CANDIDATE
ID : S0001 (WHITEBOARD IMAGE)

| DATA ID | KEYWORD (TEXT INFORMATION) | SYNONYM 1 | SYNONYM 2 | SYNONYM 3 | SYNONYM 4 | CONFIDENTIAL INFORMATION CANDIDATE |
|---|---|---|---|---|---|---|
| D0001 | BUDGET AMOUNT | BUDGET SUM | BUDGET | ALLOCATION | · · · | CANDIDATE |
| D0002 | DEVELOPMENT MEMBER CARRIER WITH COMPANY | MEMBER | CARRIER WITH COMPANY | CARRIER | · · · | CANDIDATE |
| D0003 | DEVELOPMENT CODE NAME | DEVELOPMENT CODE | DEVELOPMENT NAME | — | · · · | CANDIDATE |
| · · · | · · · | · · · | · · · | · · · | · · · | · · · |

FIG. 16

DISCLOSURE PERMISSION MANAGEMENT TABLE

COUNTERPART NAME: BC Co., Ltd.

COUNTERPART NAME: AA Co., Ltd.

| DATA ID | KEYWORD (TEXT INFORMATION) | SEARCH RESULT | NON-DISCLOSURE AGREEMENT | DISCLOSURE PERMISSION DETERMINATION |
|---|---|---|---|---|
| D0001 | BUDGET AMOUNT | SYNONYM PRESENT | NOT CONCLUDED | NOT PERMITTED |
| D0002 | DEVELOPMENT MEMBER CARRIER WITH COMPANY | NO SYNONYM | — | NOT PERMITTED |
| D0003 | DEVELOPMENT CODE NAME | SYNONYM PRESENT | CONCLUDED | PERMITTED |
| · · · | · · · | · · · | · · · | · · · |

FIG. 17

PROCESSING METHOD MANAGEMENT TABLE

CONFIDENTIAL INFORMATION CANDIDATE
ID : S0001 (WHITEBOARD IMAGE)

| DATA ID | KEYWORD (TEXT INFORMATION) | DISCLOSURE PERMISSION DETERMINATION | PROCESSING INFORMATION | |
|---|---|---|---|---|
| | | | BLURRING PROCESSING | RANGE TO BE BLURRED |
| D0001 | BUDGET AMOUNT | NOT PERMITTED | YES | ENTIRE WHITEBOARD IMAGE |
| D0002 | DEVELOPMENT MEMBER CARRIER WITH COMPANY | NOT PERMITTED | YES | KEYWORD ONLY |
| D0003 | DEVELOPMENT CODE NAME | PERMITTED | NO | NONE |
| ... | ... | ... | ... | ... |

FIG. 19

Remote Conference App / AA Product information sharing meeting     2023/7/5   09:58

7111

Please select a desired image capturing device.

| Image capturing device ID | Image capturing device name | Resolution [dpi] | Select |
|---|---|---|---|
| C0001 | 360-degree camera 1 | 600 | ✓ |
| C0002 | Panoramic camera 2 | 1200 | ☐ |
| C0003 | 360-degree camera 3 | 1200 | ☐ |
| ⋮ | ⋮ | ⋮ | ⋮ |

Start Meeting   7151

Cancel   7152

IMAGE MANAGEMENT SYSTEM, IMAGE CAPTURING DEVICE, IMAGING PROCESSING METHOD, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2023-120028, filed on Jul. 24, 2023, in the Japan Patent Office, the entire disclosure of which is hereby incorporated by reference herein.

BACKGROUND

Technical Field

The present disclosure relates to an image management system, an image capturing device, an imaging processing method, and a non-transitory computer-executable medium.

Related Art

A technology for displaying a captured image to others through a communication network is known in the art.

For example, a system control apparatus is known which sets one of a security priority area and a privacy priority area in advance for monitoring areas. In response to detecting an alarm from a monitoring sensor, the system control apparatus permits displaying video of the security priority areas on a display without performing image processing on the video, and prohibits displaying video of the privacy priority areas on the display without performing image processing on the video.

SUMMARY

In one aspect, an image management system includes an image capturing device, the image capturing device including first circuitry. The first circuitry acquires a captured image of a local site where the image capturing device is provided, the captured image being an image of surroundings around the image capturing device. The first circuitry receives a setting of a particular display mode in which the captured image is to be displayed. The first circuitry generates preview screen data representing a preview screen of a processed image obtained by performing predetermined processing on the captured image, based on the particular display mode and an image processing setting file for performing the predetermined processing on the captured image. The first circuitry transmits the preview screen data for display at a first terminal at another site where the captured image of the local site is shared.

In another aspect, an image capturing device includes circuitry. The circuitry acquires a captured image of a local site where the image capturing device is provided, the captured image being an image of surroundings around the image capturing device. The circuitry receives a setting of a particular display mode in which the captured image is to be displayed. The circuitry generates preview screen data representing a preview screen of a processed image obtained by performing predetermined processing on the captured image, based on the particular display mode and an image processing setting file for performing the predetermined processing on the captured image. The circuitry transmits the preview screen data for display at a first terminal at another site where the captured image of the local site is shared.

In another aspect, an imaging processing method is performed by an image capturing device. The method includes acquiring a captured image of a local site where the image capturing device is provided, the captured image being an image of surroundings around the image capturing device. The method includes receiving a setting of a particular display mode in which the captured image is to be displayed. The method includes generating preview screen data representing a preview screen of a processed image obtained by performing predetermined processing on the captured image, based on the particular display mode and an image processing setting file for performing the predetermined processing on the captured image. The method includes transmitting the preview screen data for display at a first terminal at another site where the captured image of the local site is shared.

In another aspect, a non-transitory computer-executable medium stores a plurality of instructions which, when executed by one or more processors, causes the one or more processors to perform the above method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 2A and 2B are diagrams illustrating an example of an imaging range of an image capturing device of FIG. 1, wherein FIG. 2A illustrates an example of capturing an image of the surroundings of the image capturing device in 360 degrees, and FIG. 2B illustrates an example of capturing an image of the surrounding upward and downward from 0 degree in the horizontal direction of the image capturing device;

FIG. 3 is a diagram illustrating an example of a panoramic image and processing to cut out talker images from the panoramic image, according to an embodiment;

FIG. 4A and FIG. 4B (FIG. 4) are illustrations of an example of a flow of predetermined processing performed on a captured image, according to an embodiment;

FIG. 10B is a block diagram illustrating an example of a functional configuration of the image display system of FIG. 1;

FIG. 11 is a conceptual diagram illustrating an example of an image capturing device information management table, according to an embodiment;

FIG. 12 is a conceptual diagram illustrating an example of a captured-image information management table, according to an embodiment;

FIG. 13 is a conceptual diagram illustrating an example of a counterpart information management table, according to an embodiment;

FIG. 14 is a conceptual diagram illustrating an example of a captured-image information management table, according to an embodiment;

FIG. 15 is a conceptual diagram illustrating an example of a confidential information management table, according to an embodiment;

FIG. 16 is a conceptual diagram illustrating an example of a disclosure permission management table, according to an embodiment;

FIG. 17 is a conceptual diagram illustrating an example of a processing method management table, according to an embodiment;

FIG. 19 is a diagram illustrating an example of a participation request screen, according an embodiment;

Figure 1:
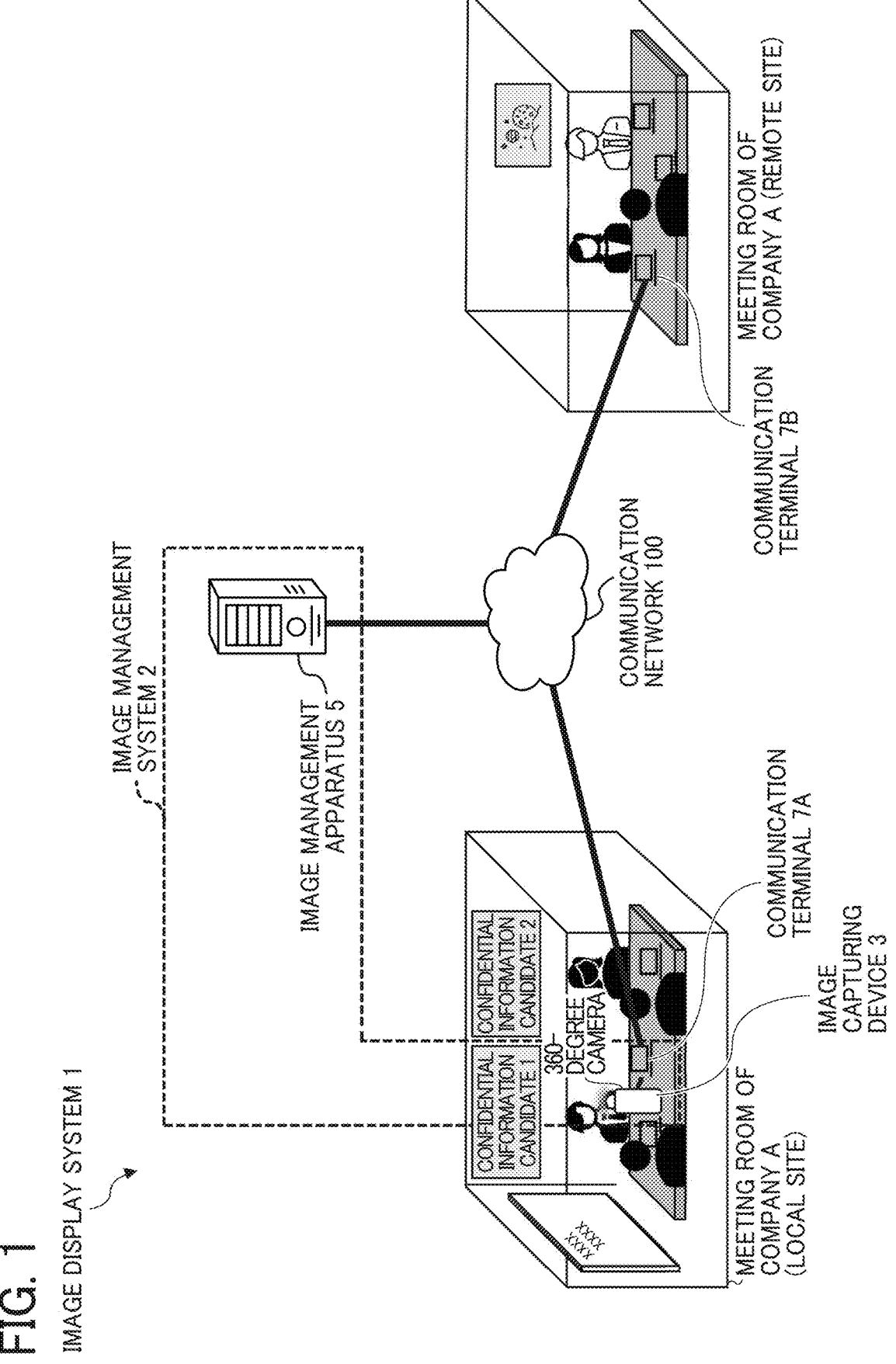
FIG. 1 is a schematic view illustrating an example of an overall configuration of an image display system, according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description given below with reference to the drawings, like reference signs denote like elements, and overlapping description may be simplified or omitted as appropriate.

Embodiment

Overall Configuration of Image Display System

FIG. 1 is a schematic diagram illustrating an example of an overall configuration of an image display system 1. As illustrated in FIG. 1, the image display system 1 includes an image capturing device 3, an image management apparatus 5, a communication terminal 7A used at a local site, and a communication terminal 7B used at a remote site. The remote site is an example of another site. In the following description, the communication terminal 7A may be referred to a "local site terminal." Further, in the following description, the communication terminal 7B may be referred to as a "remote site terminal." The communication terminal 7A is an example of a second terminal. The communication terminal 7B is an example of a first terminal. The image display system 1 includes an image management system 2. The image management system 2 includes an image capturing device 3. The image management system 2 includes an image management apparatus 5.

The image management system 2 further includes a communication terminal 7A used at a local site.

In the image display system 1 (the image management system 2), the communication terminal 7A, the image management apparatus 5, and the communication terminal 7B are connected to each other through the communication network 100.

The communication network 100 is a wired or wireless communication network through which an unspecified number of communications are established, and is constructed by the Internet, an intranet, or a local area network (LAN). The communication network 100 may include a wireless communication network in compliance with, for example, the fourth generation (4G), the fifth generation (5G), Worldwide Interoperability for Microwave Access (WiMAX), or Long Term Evolution (LTE). The communication terminal 7A, the image management apparatus 5, and the communication terminal 7B may be connected to each other through a dedicated local area network.

The image capturing device 3 and the communication terminal 7A are connected to each other through a dedicated wired cable. The image capturing device 3 and the communication terminal 7A exchange data (information) with each other using, for example, the universal serial bus video class (UVC) protocol.

Image Capturing Device

The image capturing device 3 is a device (apparatus) to capture an image of the surroundings of the image capturing device 3 in 360 degrees to obtain a captured image (panoramic image) of the local site. The image capturing device 3 may be implemented by an information processing apparatus (computer system) in which a general-purpose operating system (OS) is installed and performs communication. The image capturing device 3 is one of the components configuring the image display system 1 (image management system 2). Further, the image capturing device 3 is installed with also a communication application for communicating with the communication terminal 7A that can communicate using the UVC protocol. The communication application is stored in a memory.

The image capturing device 3 may be a wide-angle camera that can capture a panoramic image or a 360-degree camera (celestial-sphere camera) that can capture 360-degree spherical image.

Image Management Apparatus

The image management apparatus 5 is an apparatus that manages information relating to an image of the local site captured by the image capturing device 3. In the following description, such information relating to an image of the local site captured by the image capturing device 3 may be referred to as "captured-image related information." The image management apparatus 5 is implemented by an information processing terminal (computer system) in which a general-purpose operating system (OS) is installed and performs communication. The image management apparatus 5 is one of the components configuring the image display system 1 (image management system 2). The image management apparatus 5 is installed with a communication application for communicating with the communication terminal 7A connected to the image capturing device 3. The communication application is stored in a memory.

The image management apparatus 5 may be a general-purpose personal computer (PC) or a server apparatus.

The image management apparatus 5 may notify the communication terminal 7 connected through the communication network 100 of data (information) by push notification. In other words, the image management apparatus 5 may transmit data (information) to the communication terminal 7 connected through the communication network 100 by push transmission. In this case, the image management apparatus 5 may perform the push notification via, for example, Firebase Cloud Messaging (FCM), which is an example of a push notification server.

Communication Terminal

The communication terminals 7 are communication terminals used at the local site where the image capturing device 3 is used or at a remote site where the captured image of the local site is shared. The communication terminal 7A among the communication terminals 7 is a terminal that transmits and receives image data relating to an image of the local site captured by the image capturing device 3 to and from the image capturing device 3. Further, at the communication terminals 7A connected to the image capturing device 3 using, for example, the UVC protocol, a captured image of the local site is displayed. Alternatively, the communication terminal 7 and the image capturing device 3 may communicate with each other using a short-range wireless communication technology such as BLUETOOTH LOW ENERGY (BLE) or near field communication (NFC) instead of the UVC protocol.

The communication terminal 7B among the communication terminals 7 is a communication terminal used at the remote site. At the communication terminal 7B, the captured image of the local site captured by the image capturing device 3 is displayed. At the communication terminal 7 of another user who uses the local site, an image (captured image) of the remote site is displayed. As described above, in the image display system 1, at the communication terminals 7 other than the communication terminal 7 connected to the image capturing device 3 using the UVC protocol, an image (captured image) of the remote site is displayed.

The communication terminal 7 is implemented by an information processing terminal (computer system) in which a general-purpose operating system (OS) is installed and performs communication. The communication terminal 7 is one of the components configuring the image display system 1 (image management system 2). The communication terminal 7 is installed with a communication application for communicating with the image management apparatus 5. The communication application is stored in a memory.

The communication terminal 7 may be a communication terminal having communication capability. Examples of the communication terminal 7 include, but are not limited to, a general-purpose PC, a laptop computer; a mobile phone, a smartphone, a tablet terminal, a wearable terminal (of sunglass type or wristwatch type, etc.), and an interactive whiteboard apparatus (IWB).

Alternatively, the communication terminal 7 may be a communication apparatus or a communication terminal in which software of applications such as browser software and a teleconference application is installed and operates. In the present embodiment, the communication terminal 7A and the communication terminal 7B are referred to simply as the "communication terminal 7" unless they have to distinguished from each other.

Terms

In the present embodiment, the term "event" refers to, for example, an online conference (web conference) or an online meeting that is conducted through a communication network. In the present embodiment, the term "online conference (web conference)" may be used to indicate an example of the "event."

In the present embodiment, the term "user" refers to a user who uses the image display system 1 (image management system 2) or an administrator who manages the user. The term "user" further refers to a participant who participates in, for example, a web conference. In the present embodiment, the term "user" is used unless otherwise specified.

Imaging Range of Image Capturing Device

A description is now provided of the imaging range of the image capturing device 3. FIGS. 2A and 2B are diagrams illustrating an example of the imaging range of the image capturing device 3 according to an embodiment. FIG. 2A illustrates an example of capturing an image of the surroundings of the image capturing device 3 in 360 degrees. FIG. 2B illustrates an example of capturing an image of the surrounding upward and downward from 0 degree in the horizontal direction of the image capturing device 3. As illustrated in FIG. 2A, the image capturing device 3 captures an image of a range of 360 degrees in the horizontal direction. As illustrated in FIG. 2B, the image capturing device 3 captures an image in predetermined angles up and down from a 0-degree direction that is horizontal to the height of the image capturing device 3.

Figure 3:
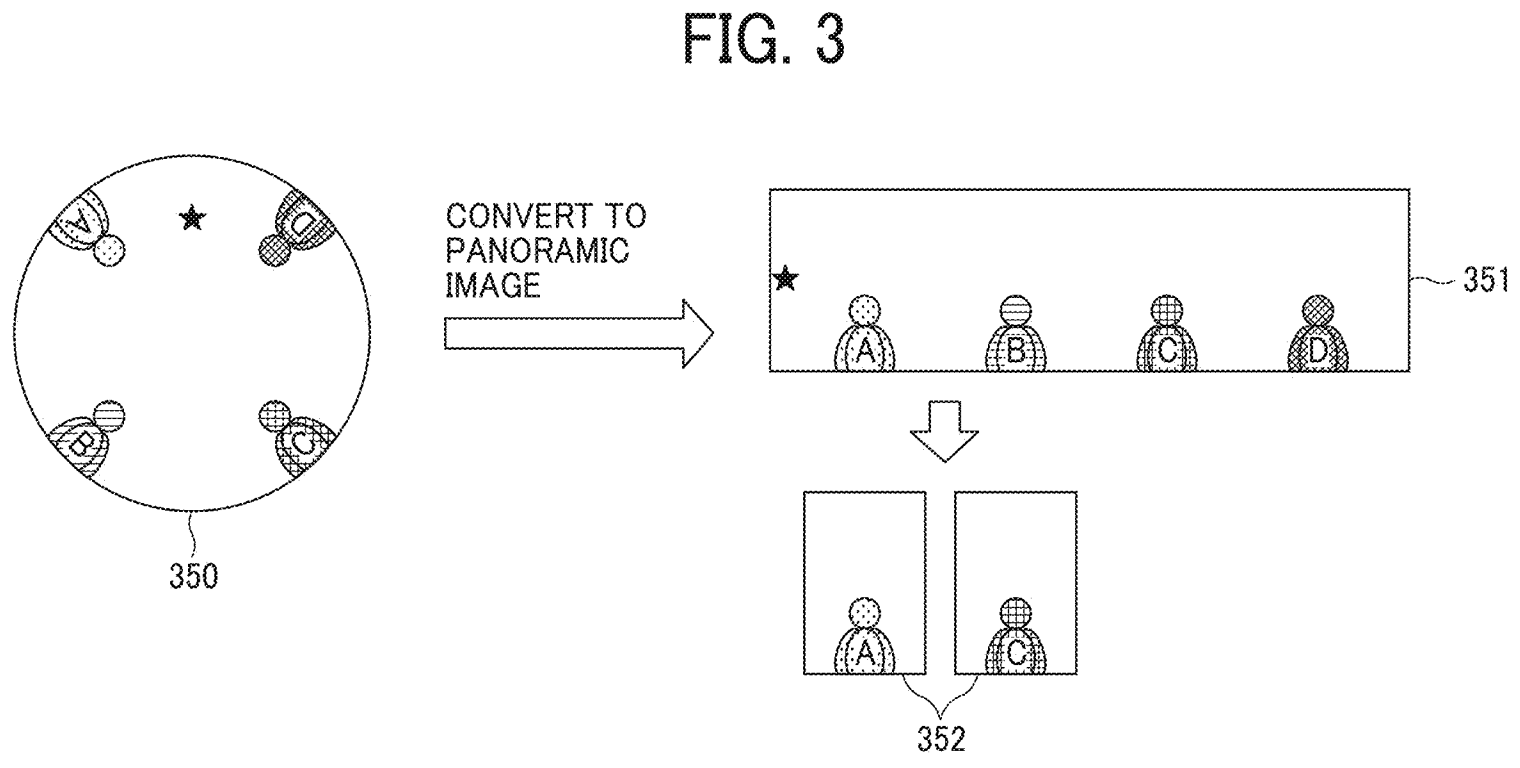

Diagram Illustrating Panoramic Image and Processing to Cut Out Talker Images from Panoramic Image FIG. 3 is a diagram illustrating an example of a panoramic image and processing to cut out talker images from the panoramic image according to an embodiment. As illustrated in FIG. 3, an image captured by the image capturing device 3 forms a part 350 of a sphere, and thus has a three-dimensional shape. As illustrated in FIG. 2A, the image capturing device 3 divides the angles of view by a predetermined angle in the vertical direction and by a predetermined angle in the horizontal direction to perform perspective projection transformation on each of the angles of view. The image capturing device 3 performs the perspective projection transformation on the entire 360-degree range in the horizontal direction without gaps to obtain a predetermined number of planar images and laterally connects the predetermined number of planar images to obtain a panoramic image 351. Further, the image capturing device 3 performs processing to detect a human face in a predetermined range centered around the direction of audio in the panoramic image, and cuts out images by, for example, 15 degrees each (30 degrees in total) to the left and right from the center of the face of each of the users at the local site and the remote site to generate talker images 352.

Flow of Processing Process Performed on Captured Image

Figures 4, 4A:
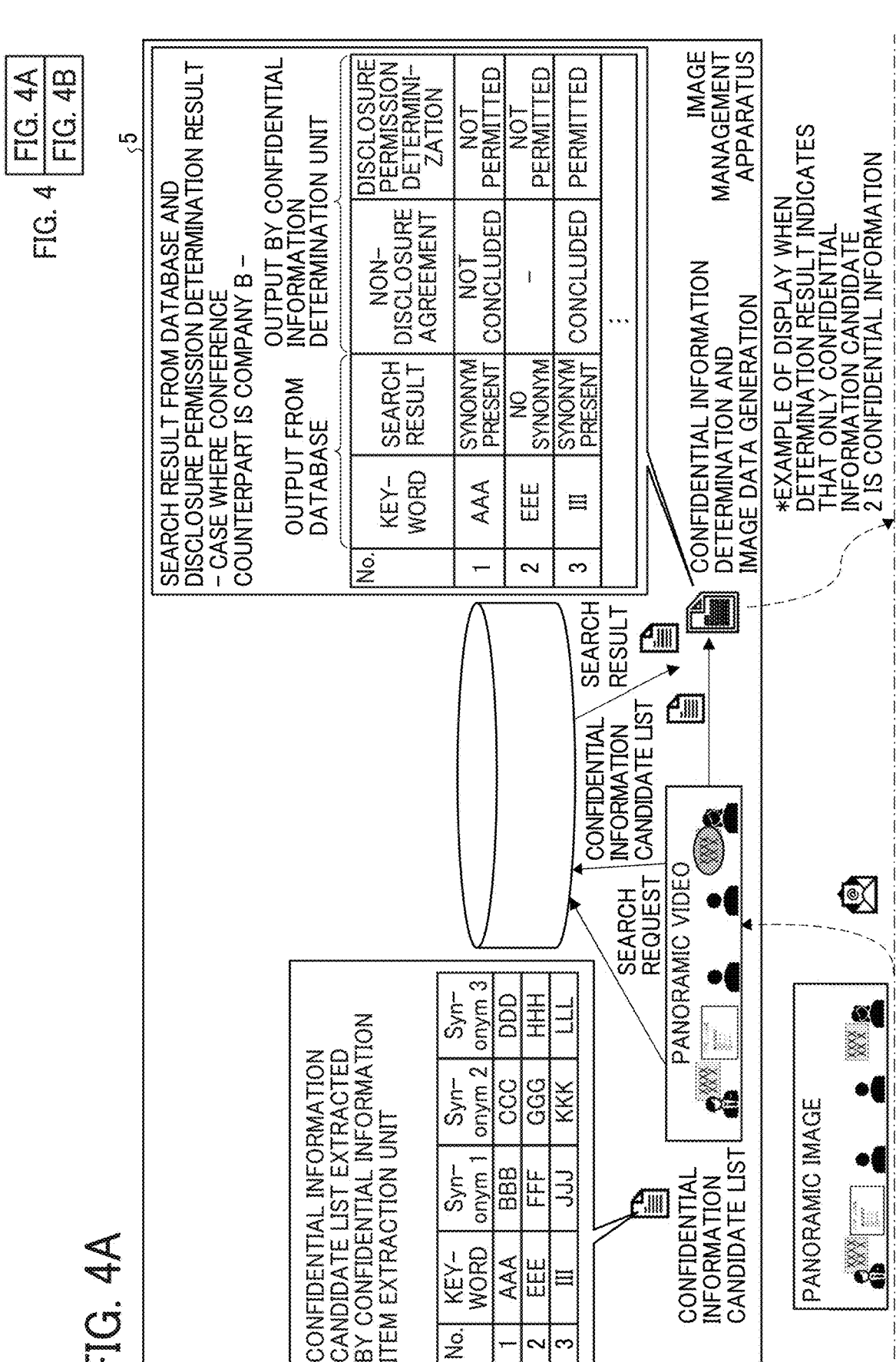

FIG. 4A and FIG. 4B (FIG. 4) are illustration of an example of a flow of predetermined processing performed on a captured image, according to an embodiment. FIG. 4 schematically illustrates a case where a meeting room of Company A as a local site in which the image capturing device 3 and the communication terminal 7A connecting to the image capturing device 3 are provided, a meeting room of Company B as a remote site in which the communication terminal 7B are provided, and the image management apparatus 5 are connected to each other through the communication network. Specifically, the image capturing device 3 transmits, to the image management apparatus 5, captured-image related information including data of an image of the surrounding in the meeting room of Company A captured by the image capturing device 3 and an event counterpart information (conference counterpart information) acquired from the communication terminal 7A. Subsequently, the image management apparatus 5 generates a confidential information candidate list, a confidential information determination result, and image data, and transmits screen data configuring a screen to be displayed at the meeting room of Company B as the remote site. In the panoramic image illustrated in FIG. 4, "Confidential Information Candidate 1" is not confidential information for the event counterpart (conference counterpart). Accordingly, an output without processing is permitted, and no processing is not performed on the "Confidential Information Candidate 1." On the other hand, "confidential Information candidate 2" is confidential information for the event counterpart. Accordingly, a predetermined processing (e.g., blurring processing) is performed on an image representing "confidential information candidate 2," to obtain a processed image, and the processed image is displayed at the communication terminal 7B in the meeting room of Company B.

At the image management apparatus 5, an image processing setting file is generated on the basis of the captured-image related information corresponding to captured-image data relating to the captured image (panoramic image) captured by the image capturing device 3 in the meeting room of Company A. The image processing setting file is a setting file for performing predetermined processing for concealing confidential information included in the captured image. Specifically, the image processing setting file is a setting information program for performing the predetermined processing on the basis of confidential information relating to a non-disclosure agreement concluded between, for example, Company A and Company B. Further, the image processing setting file includes confidential information determination data based on a confidential information search list generated by searching for a keyword included in, for example, characters in the panoramic image.

Subsequently, the image management apparatus 5 generates an image processing setting file including image data to be displayed on the communication terminal 7B provided in the meeting room of Company B, and causes the communication terminal 7B provided in the meeting room OF Company B to display a screen including the image on which the predetermined processing is performed. In the present embodiment, a keyword to be concealed included in the screen displayed on the communication terminal 7B provided in the meeting room of Company B is subjected to processing of blurring the keyword or a predetermined area including the keyword.

Relation Between Resolution and Target Distance

Figure 5:
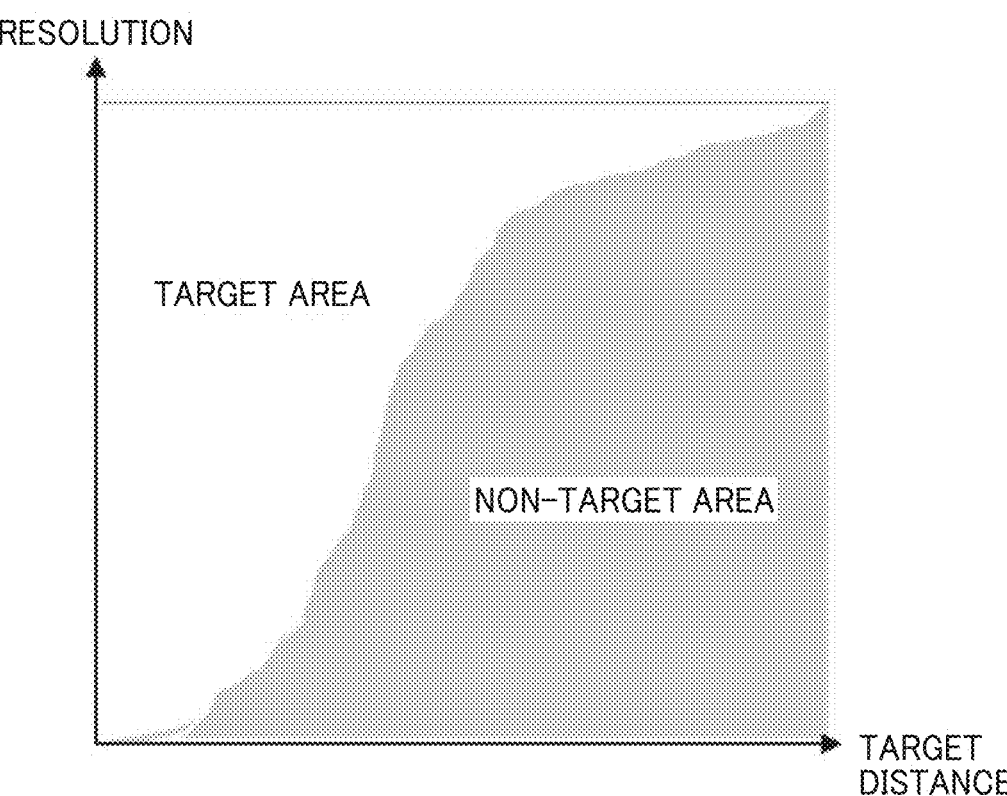
FIG. 5 is an illustration of an example of a relation between a resolution and a target distance, according to an embodiment.

FIG. 5 is an illustration of an example of a relation between a resolution and a target distance according to an embodiment. As illustrated in FIG. 5, regarding the relation between the resolution and the target distance, a target range of the processing and a non-target range of the processing are divided by a predetermined boundary (threshold value). The resolution is an example of an index indicating the performance of the image capturing device 3. The target distance indicates a distance between the image capturing device 3 and a subject. For example, when the resolution is high and the target distance is relatively far from the predetermined threshold value, confidential information candidate is highly likely to be clearly displayed. Accordingly, the confidential information candidate is in the target range of the predetermined processing. By contrast, for example, when the resolution is low and the target distance is relatively longer than the predetermined threshold value, confidential information candidate is less likely to be clearly displayed. Accordingly, the confidential information candidate is in the non-target range of the predetermined processing. The illustration of FIG. 5 is one example, and the boundary (threshold value) that divides the target range and the non-target range is not limited thereto.

Screen Display Example 1 in Display Mode

Figure 6A:
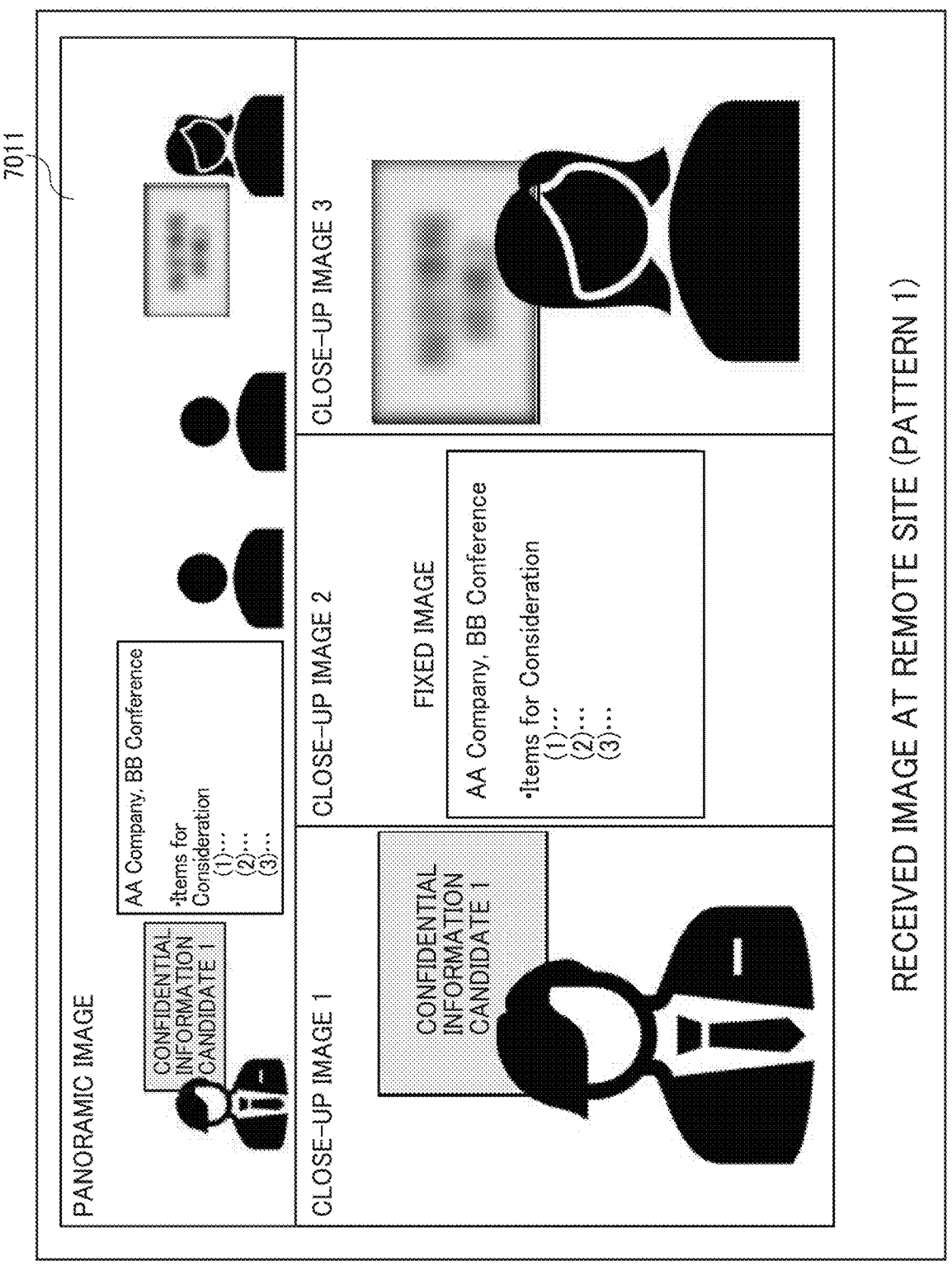
FIG. 6A is a diagram illustrating an example of a display mode specific screen, according to an embodiment.

A description is now given of a screen display example in a display mode. FIG. 6A is a diagram illustrating an example of a display mode specific screen according to an embodiment. As illustrated in FIG. 6A, the communication terminal 7B at the remote location displays a display mode specific screen 7011 as an image of a display mode pattern 1. On the display mode specific screen 7011, a panoramic image representing a captured image of the local site captured by the image capturing device 3 is displayed. Further, in the display mode specific screen 7011, three close-up images 1, 2, and 3 of closed-ups of a particular talker or a fixed image in the panoramic image are displayed side by side. The close-up image is an example of a talker image. Specifically, the close-up image 1 is an image in which a talker on the left end of the panoramic image (referred to as "Talker 1") is closed up. In the close-up image 1, "confidential information candidate 1" behind Talker 1 is displayed. The close-up image 2 is an image obtained by closing up a fixed image (e.g., a whiteboard image) in the panoramic image. A close-up image 3 is an image in which a talker on the right side of the panoramic image (referred to as "Talker 2") is closed up. In the close-up image 3, "confidential information candidate 2" behind Talker 2 is displayed. Note that the content of the "confidential information candidate 2" corresponds to the "blurring processing" which is an example of the predetermined processing in the present embodiment. Accordingly, the "confidential information candidate 2" is displayed with its entire content blurred as illustrated in FIG. 6A. In this case, the "confidential information candidate 2" in the panoramic image is displayed with its entire content blurred in substantially the same manner. In other words, on the display mode specific screen 7011, the predetermined processing is performed on both the panoramic image and the close-up image for the areas on which the predetermined processing is to be performed.

Although in the present embodiment, a description is given of a case in which the "blurring processing" is an example of the predetermined processing performed on a captured image (captured-image data), the predetermined processing is any other suitable processing provided that information to be concealed is processed such that a participant in an online event such as an online conference cannot recognize (read) the information. Other examples of the predetermined processing to be performed on the captured image (captured-image data) include "erasing processing," "overpainting processing," "vibration processing," and "substitution (replacement) processing."

The arrangement of the panoramic image and the close-up images in the display mode specific screen 7011 as illustrated in FIG. 6A is merely one example, and the panoramic image and the close-up images may be arranged in any other suitable manner. Further, the number of images of the talker image is not limited to three. Furthermore, although FIG. 6A illustrates an example case in which each talker is displayed facing forward, the direction of each talker in the panoramic image may be changed to any desired angle, and the image of the talker whose angle has been changed may be displayed as a corresponding close-up image.

Screen Display Example 2 in Display Mode

Figure 6B:
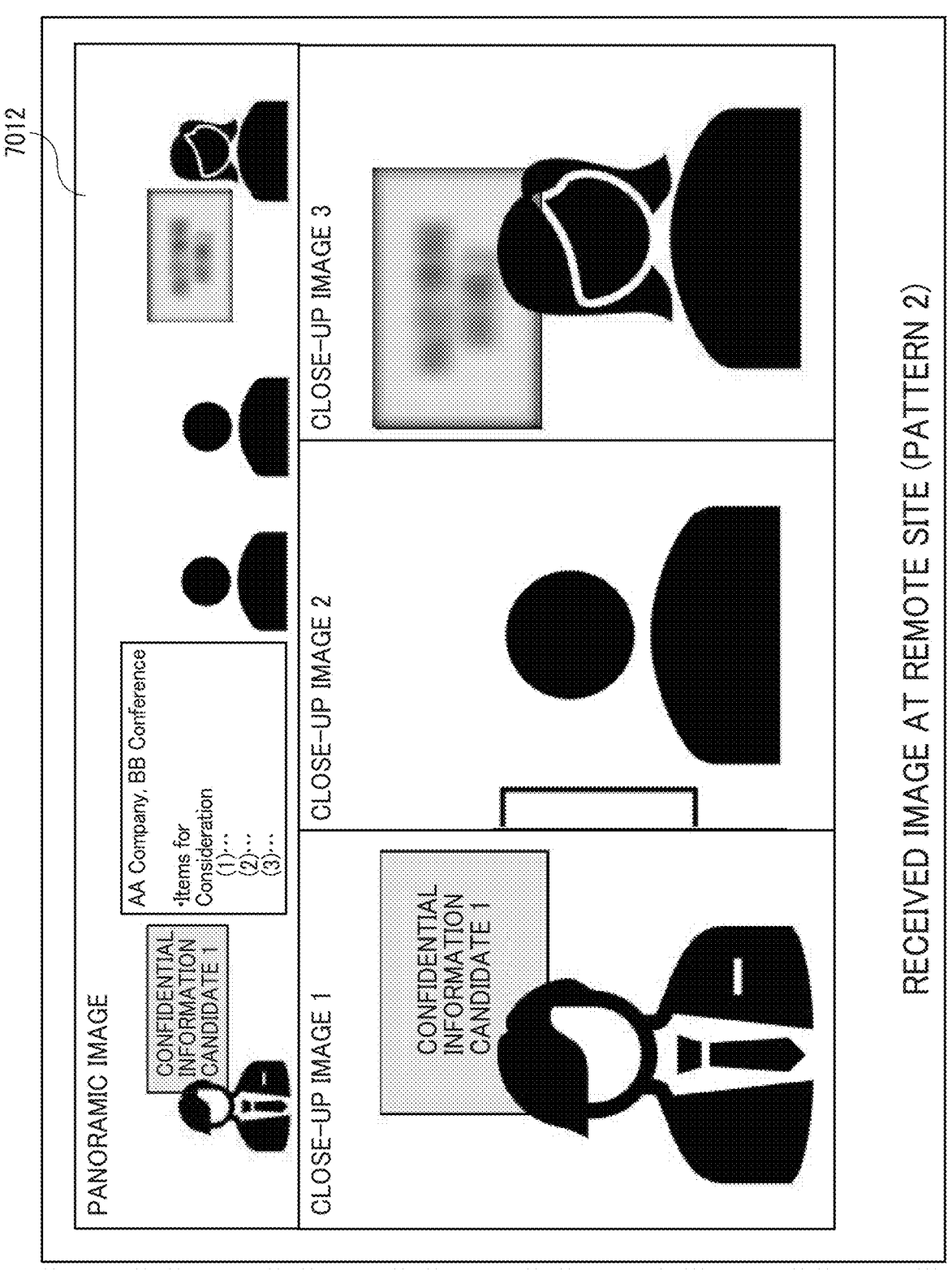
FIG. 6B is a diagram illustrating another example of a display mode specific screen, according to an embodiment.

FIG. 6B is a diagram illustrating another example of a display mode specific screen according to an embodiment. As illustrated in FIG. 6B, the communication terminal 7B at the remote location displays a display mode specific screen 7012 as an image of a display mode pattern 2. On the display mode specific screen 7012, the close-up image 2 of the display mode specific screen 7011 is changed from the fixed image to an image of the upper body of the participant at the center of the panoramic image.

Screen Display Example 3 in Display Mode

Figure 6C:
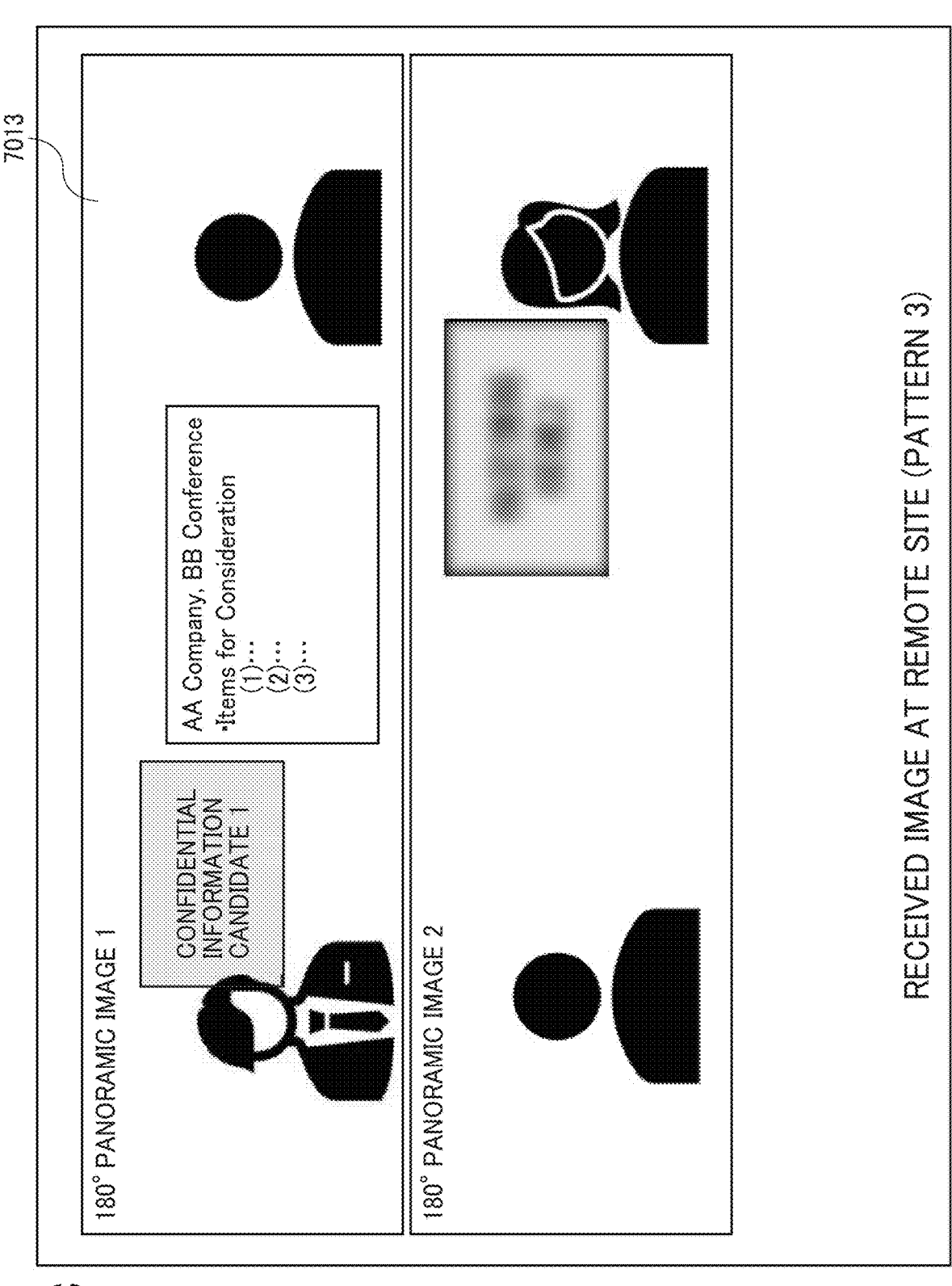
FIG. 6C is a diagram illustrating another example of a display mode specific screen, according to an embodiment.

FIG. 6C is a diagram illustrating another example of a display mode specific screen according to an embodiment. As illustrated in FIG. 6C, the communication terminal 7B at the remote location displays a display mode specific screen 7013 as an image of a display mode pattern 3. On the display mode specific screen 7013, a 180-degree panoramic image 1 and another 180-degree panoramic image 2 from among the 360-degree panoramic image representing the captured image of the local site captured by the image capturing device 3 are displayed vertically. In this case, an image obtained by performing the "blurring processing" on the "confidential information candidate 2" is displayed, in substantially the same manner as the display mode specific screen 7011.

Screen Display Example 4 in Display Mode

Figure 6D:
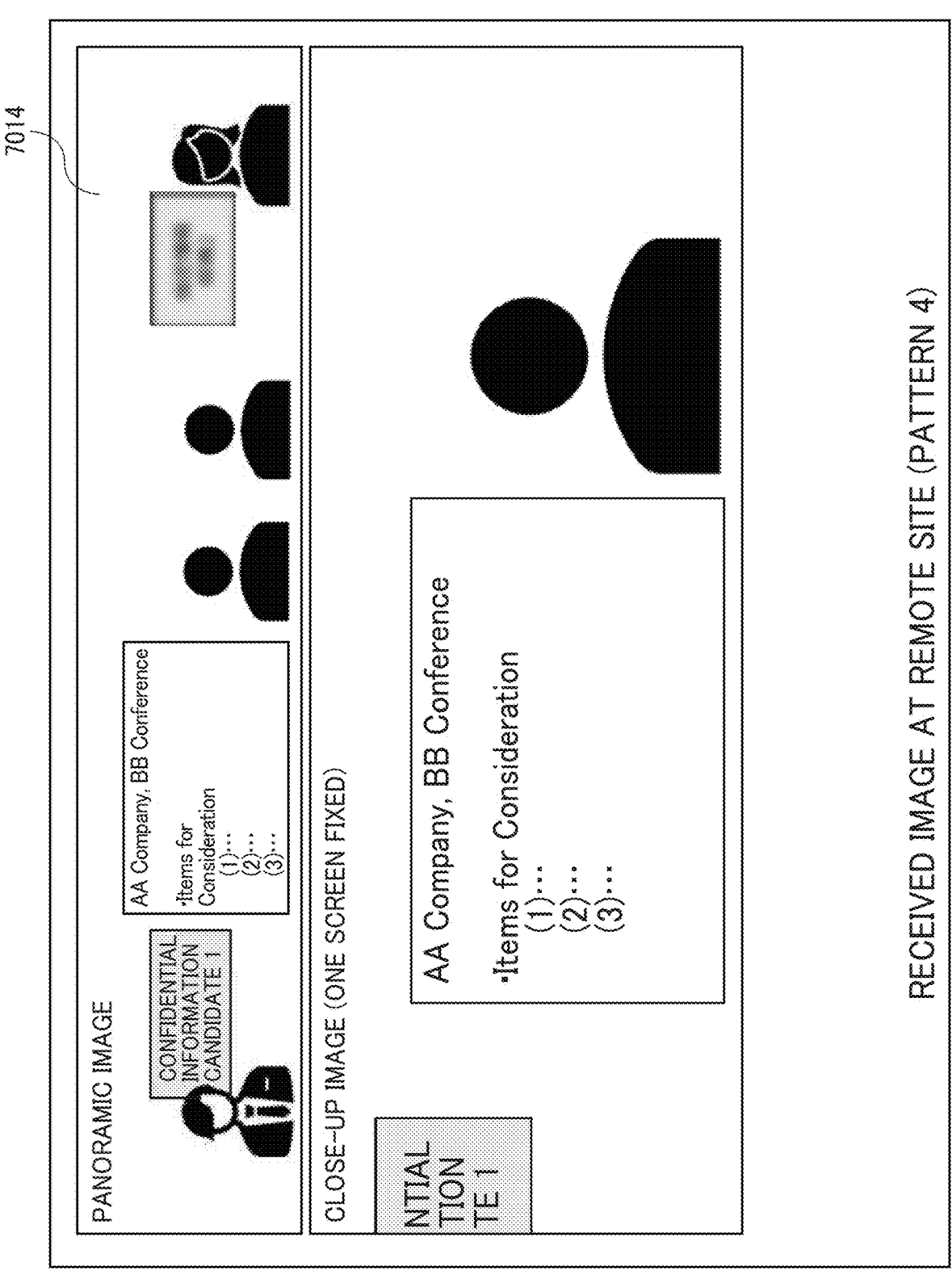
FIG. 6D is a diagram illustrating another example of a display mode specific screen, according to an embodiment.

FIG. 6D is a diagram illustrating another example of a display mode specific screen according to an embodiment. As illustrated in FIG. 6C, the communication terminal 7B at the remote location displays a display mode specific screen 7014 as an image of a display mode pattern 4. On the display mode specific screen 7014, a panoramic image representing the captured image of the local site captured by the image capturing device 3 and a close-up image (one screen fixed) in which a particular talker or a fixed image in the panoramic image is closed up.

As illustrated in FIG. 6D, the close-up image is displayed larger on the display mode specific screen 7014.

Screen Display Example 5 in Display Mode

Figure 6E:
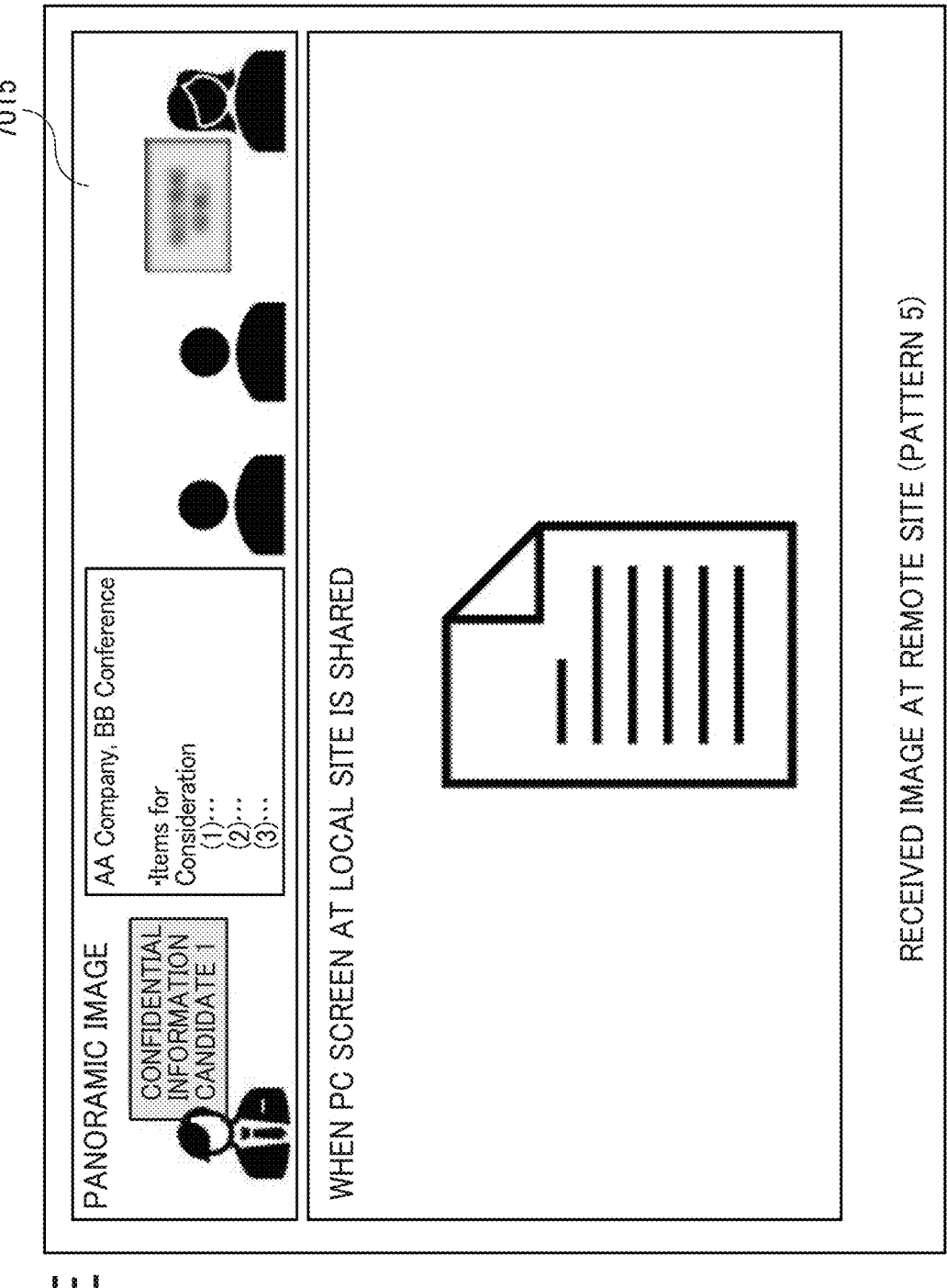
FIG. 6E is a diagram illustrating another example of a display mode specific screen, according to an embodiment.

FIG. 6E is a diagram illustrating another example of a display mode specific screen according to an embodiment. As illustrated in FIG. 6E, the communication terminal 7B at the remote location displays a display mode specific screen 7015 as an image of a display mode pattern 5. On the display mode specific screen 7015, a panoramic image representing a captured image of the local site captured by the image capturing device 3, and a file shared by the communication terminal at the local site or an icon image indicating the file are displayed. As illustrated in FIG. 6E, an object shared on a screen is displayed on the display mode specific screen 7015. Examples of the object include, but are not limited to, a file, a photograph, and text information.

The screen display examples in the display modes are not limited to the above-described five examples.

Hardware Configuration

Figure 7:
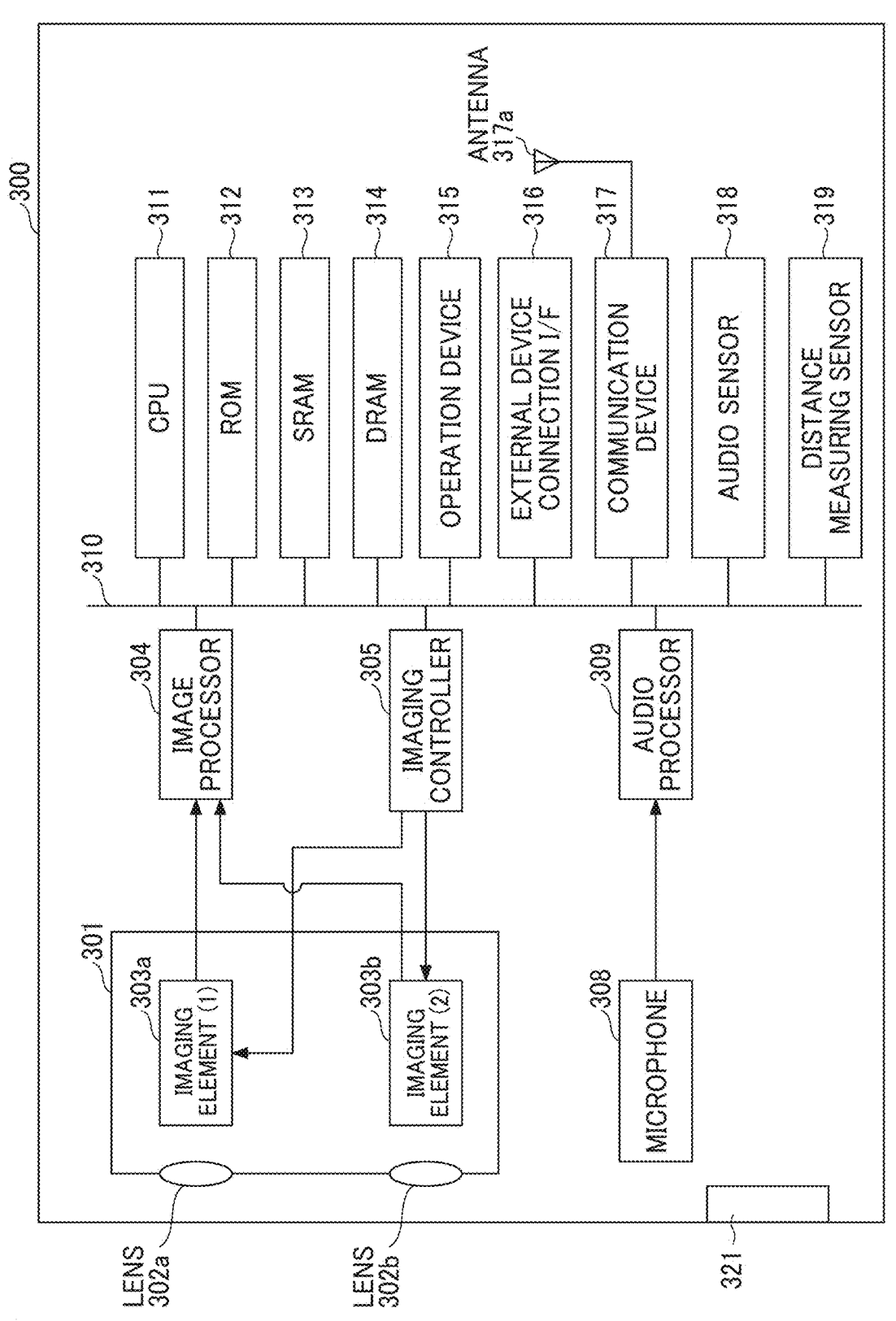
FIG. 7 is a block diagram illustrating an example hardware configuration of the image capturing device of FIG. 1.
Figure 8:
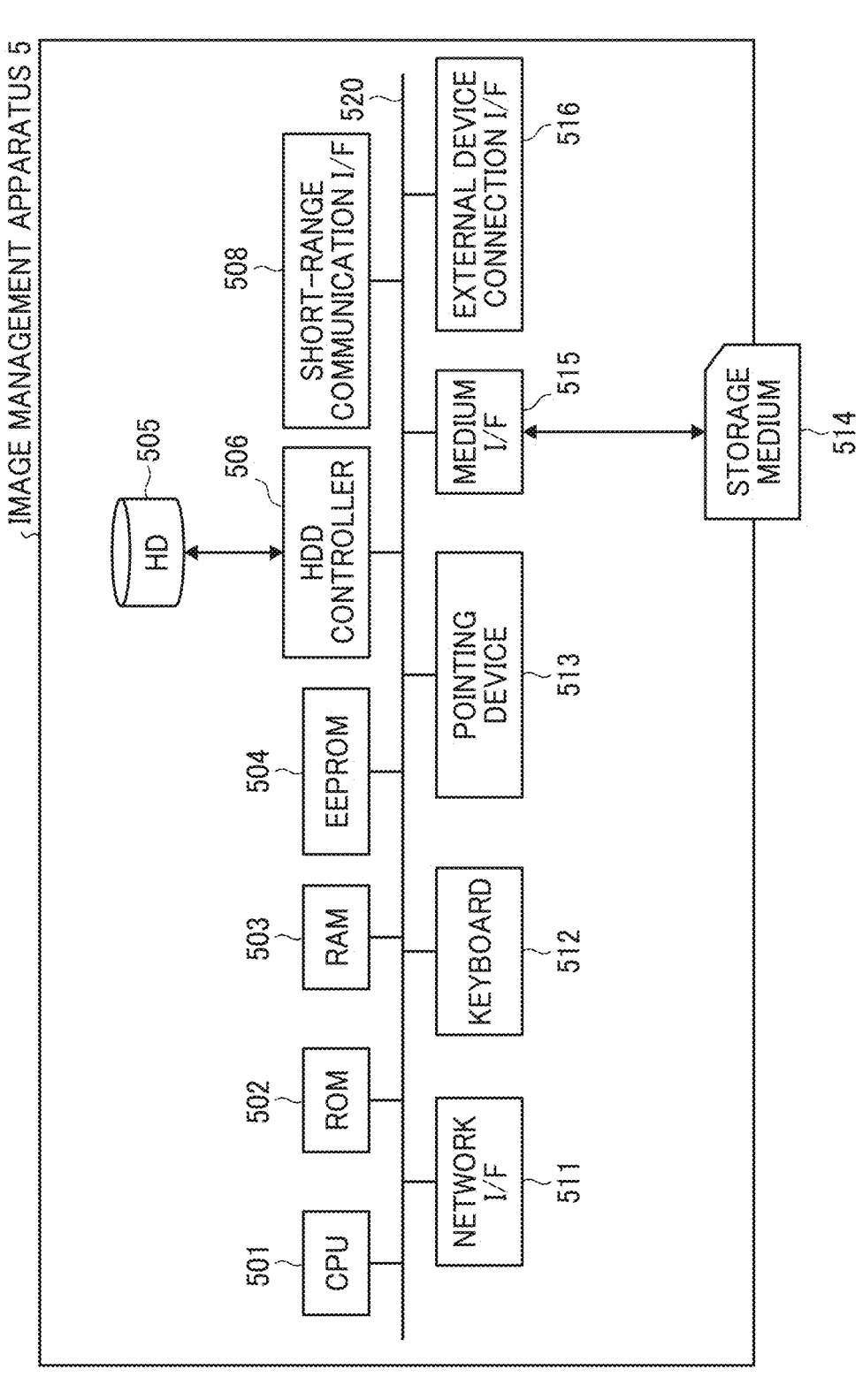
FIG. 8 is a diagram illustrating an example of a hardware configuration of an image management apparatus of FIG. 1.
Figure 9:
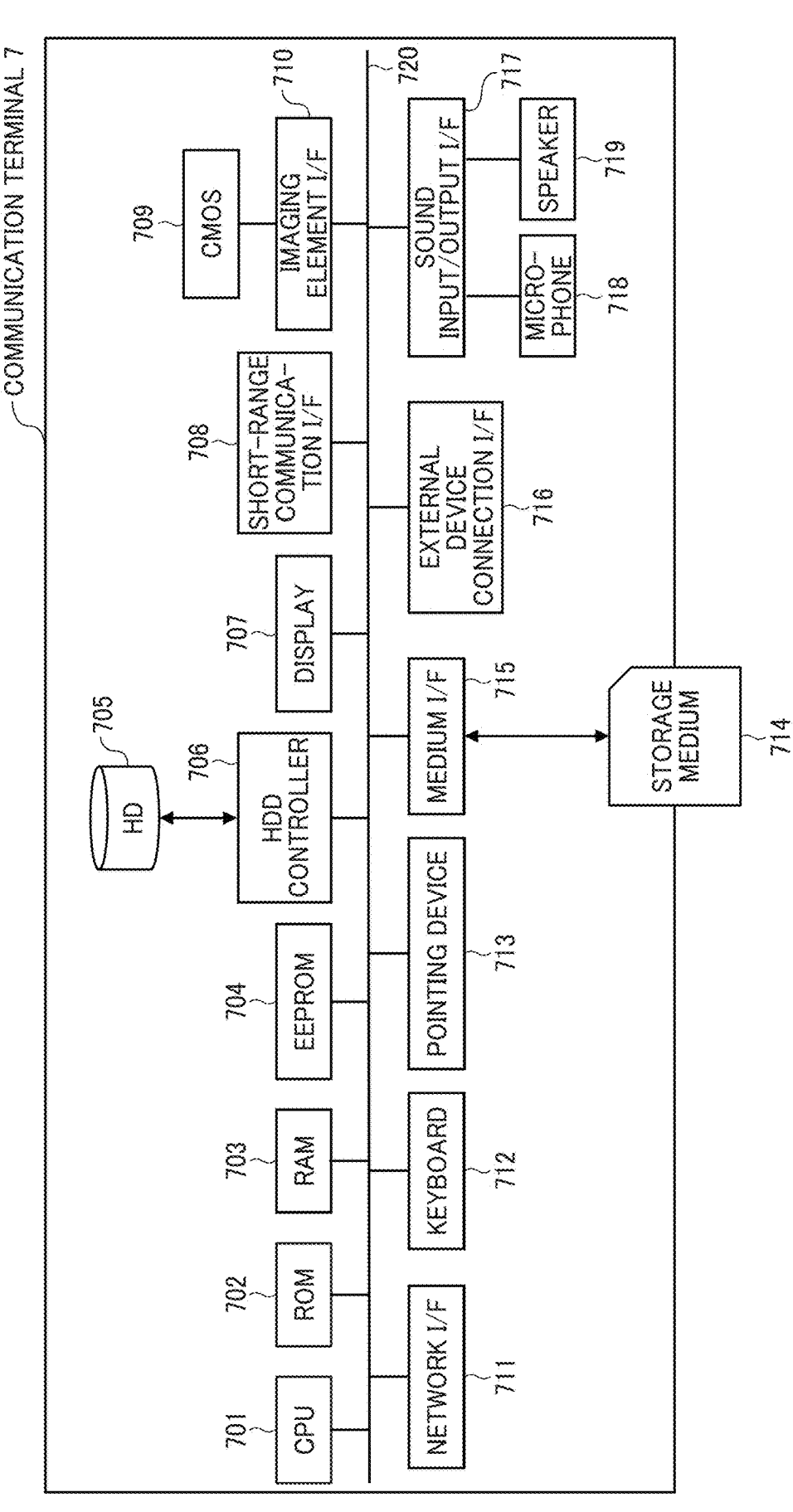
FIG. 9 is a block diagram illustrating an example hardware configuration of a communication terminal of FIG. 1.

With reference to FIG. 7 to FIG. 9, a description is given of hardware configurations of the devices and the apparatuses of the image display system according to an embodiment. In the hardware configurations of the devices and the apparatuses illustrated in FIG. 7 to FIG. 9, certain hardware elements may be added or deleted as appropriate.

Hardware Configuration of Image Capturing Device

FIG. 7 is a block diagram illustrating an example hardware configuration of the image capturing device 3 according to an embodiment. In the following description, the image capturing device 3 is assumed to be a device that uses an imaging element to capture a 360-degree image (still image or movie) of the surroundings of the image capturing device 3 at a predetermined height. The number of imaging elements may be one or two or more. The image capturing device 3 is not necessarily a dedicated device. Alternatively, an external imaging unit that can capture an image of surroundings in 360 degrees may be retrofitted to a PC, a digital camera, or a smartphone to implement an image capturing device having substantially the same functions as those of the image capturing device 3.

As illustrated in FIG. 7, the image capturing device 3 is implemented by, for example, a computer. The image capturing device 3 includes an imaging unit 301, an image processor 304, an imaging controller 305, a microphone 308, an audio processor 309, a central processing unit (CPU) 311, a read-only memory (ROM) 312, a static random-access memory (SRAM) 313, a dynamic random-access memory (DRAM) 314, an operation device 315, an external device connection interface (I/F) 316, a communication device 317, an antenna 317a, an audio sensor 318, a distance measuring sensor 319, and a terminal 321 such as a universal serial bus (USB) TYPE-C having a concave shape.

The imaging unit 301 includes so-called fisheye lens 302a and 302b each being a wide-angle lens, and imaging elements (image sensors) 303a and 303b respectively corresponding to the fisheye lenses. Each of the fisheye lenses 302a and 302b has an angle of view of 360 degrees so as to form a hemispherical image. In the following description, the imaging elements 303a and 303b may be collectively referred to as "imaging elements 303." Each of the imaging elements 303 includes an imaging sensor such as a complementary metal oxide semiconductor (CMOS) sensor and a charge-coupled device (CCD) sensor, a timing generation circuit, and a group of registers. The imaging sensor converts an optical image formed by the fisheye lenses 302 into electrical signals to output image data. The timing generation circuit generates horizontal or vertical synchronization signals, pixel clocks and the like for the imaging sensor. Various commands, parameters, and the like for operations of the imaging elements 303 are set in the group of registers. The imaging unit 301 is, for example, a 360-degree camera. The imaging unit 301 is an example of imaging means that can capture an image of surroundings at 360 degrees around the image capturing device 3. In another example, multiple data items acquired respectively by multiple imaging elements (e.g., two imaging elements each outputting a 180-degree image data) are combined to obtain an image of an angle of view of 360 degrees.

Each of imaging elements 303 (image sensors) of the imaging unit 301 is connected to the image processor 304 via a parallel I/F bus. In addition, the imaging elements 303 of the imaging unit 301 are connected to the imaging controller 305 via a serial I/F bus such as an I2C bus. The image processor 304, the imaging controller 305, and the audio processor 309 are each connected to the CPU 311 via a bus 310. The ROM 312, the SRAM 313, the DRAM 314, the operation device 315, the external device connection I/F 316, the communication device 317, the audio sensor 318, and the distance measuring sensor 319 are also connected to the bus 310.

The image processor 304 obtains image data output from the imaging elements 303 through the parallel I/F bus and performs predetermined processing on the image data to generate data of a panoramic image and data of a talker image from the fisheye video. The image processor 304 combines the panoramic image and the talker image together to output a single video (moving image).

The imaging controller 305 usually serves as a master device, whereas the imaging element 303 usually serves as a slave device. The imaging controller 305 sets commands in the group of registers of the imaging element 303 via the I2C bus. The imaging controller 305 receives various commands from the CPU 311. Further, the imaging controller 305 acquires status data of the group of registers of the imaging elements 303 also via the I2C bus and transmits the status data to the CPU 311.

Further, the imaging controller 305 instructs the imaging element 303a and the imaging element 303b to output image data at a timing when an imaging start button of the operation device 315 is pressed or at a timing when an instruction to start imaging is received from the communication terminal 7. In some cases, the image capturing device 3 is configured to display a preview image on a display (e.g., the display of a PC or a smartphone) or display a moving image (movie). In the case of displaying movie, image data are continuously output from the imaging elements 303 at a predetermined frame rate (expressed in frames per minute).

Furthermore, as described below, the imaging controller 305 operates in cooperation with the CPU 311 to synchronize the time when the imaging element 303a outputs image data and the time when the imaging element 303b outputs image data. In the present embodiment, the image capturing device 3 does not include a display unit (display). However, in another example, the image capturing device 3 can include a display.

The microphone 308 converts sound into audio data (signals). The audio processor 309 acquires audio data output from the microphone 308 via an I/F bus and performs processing on the audio data.

The CPU 311 controls entire operation of the image capturing device 3 and performs necessary processing. The ROM 312 stores various programs for execution by the CPU 311.

Each of the SRAM 313 and the DRAM 314 operates as a work memory that stores programs loaded from the ROM 312 for execution by the CPU 311 or data in current processing. More specifically, in one example, the DRAM 314 stores image data currently processed by the image processor 304 and data of an equirectangular projection image on which processing has been performed.

The operation device 315 collectively refers to various operation keys such as an imaging start button. A user operates the operation device 315 to start capturing an image or recording. In addition, the user operates the operation device 315 to turn on or off the image capturing device 3, to establish a connection for communication, and to input settings such as various imaging modes and imaging conditions.

The external device connection I/F 316 is an interface for connecting the image capturing device 3 to various external devices. Examples of the external devices include, but are not limited to, a PC, a display, a projector, and an interactive whiteboard apparatus. The external device connection I/F 316 may include, for example, a USB terminal and/or a HIGH-DEFINITION MULTIMEDIA INTERFACE (HDMI) terminal. Moving image data and image data stored in the DRAM 314 are transmitted to an external terminal or recorded in an external medium via the external device connection I/F 316. Further, a plurality of external device connection I/Fs 316 may be used. In this case, while the image capturing device 3 transmits image information captured and acquired by the image capturing device 3 to the communication terminal 7 using the UVC protocol associated with a USB connection to cause the image information to be recorded in the communication terminal 7, the image capturing device 3 acquires an image (e.g., screen information representing a screen to be displayed by the teleconference application) from the communication terminal 7, and further transmits the image to another external devices (e.g., a display, a projector, or an interactive whiteboard apparatus) via HDMI to cause the image to be displayed at the other external device.

The communication device 317 may communicate with a cloud server through the Internet using a wireless communication technology such as WIRELESS FIDELITY (WI-FI) via the antenna 317a of the image capturing device 3 to transmit the stored moving image data and image data to the cloud server. The communication device 317 may communicate with nearby devices using a short-range wireless communication technology such as BLUETOOTH LOW ENERGY (BLE) or the NFC.

The audio sensor 318 is a sensor that acquires 360-degree audio information in order to identify the direction from which a loud sound is input within a 360-degree space (on a horizontal plane) around the image capturing device 3. The audio processor 309 identifies a direction in which the volume of the audio is highest on the basis of the input 360-degree audio parameter, and outputs the direction from which the audio is input within the 360-degree space.

Another sensor such as an azimuth/acceleration sensor or a global positioning system (GPS) may calculate, for example, an azimuth, a position, an angle, and/or an acceleration and use the calculated azimuth, position, angle, and/or acceleration in image correction or addition of position information.

The image processor 304 also performs processing described below.

The CPU 311 generates a panoramic image according to a method below. The CPU 311 performs predetermined camera image processing such as Bayer conversion (RGB interpolation processing) on raw data input from the image sensor that input a spherical video and generates a fisheye image (a video including curved-surface images). Further, the CPU 311 performs flattening processing such as dewarping processing (distortion correction processing) on the generated fisheye video (curved-surface video) to generate a panoramic image (video including flat-surface images) of a 360-degree surroundings of the image capturing device 3.

The CPU 311 generates a talker image according to a method below. The CPU 311 clips a portion including a talker from the panoramic image (video including flat-surface images) of the surroundings in 360 degrees around the image capturing device 3 to generate a talker image. The talker image is an example of a close-up image. The CPU 311 identifies the direction of the input sound identified from the sound of the surroundings at 360 degrees using the audio sensor 318 and the audio processor 309 as a direction of a talker and cuts out a talker image from the panoramic image. Specifically, the CPU 311 clips a 30-degree portion around the sound input direction identified from the 360-degree surrounding space, and performs face detection on the 30-degree portion, to clip the talker image on the basis of the audio input direction. The CPU 311 further identifies talker images of a specific number of persons (e.g., three persons) who have most recently spoken among the clipped talker images.

The panoramic image and the one or more talker images may be individually transmitted to, for example, an information recording application. Alternatively, the image capturing device 3 generates one image from the panoramic image and the one or more talker images and transmit the one image to, for example, the information recording application. In the present embodiment, the panoramic image and one or more talker images are individually transmitted from the image capturing device 3 to, for example, the information recording application.

Hardware Configuration of Image Management Apparatus

FIG. 8 is a diagram illustrating an example of a hardware configuration of the image management apparatus 5 according to an embodiment. As illustrated in FIG. 8, the image management apparatus 5 is implemented by, for example, a computer. The image management apparatus 5 includes a CPU 501, a ROM 502, a RAM 503, an electrically erasable programmable read-only memory (EEPROM) 504, a hard disk (HD) 505, a hard disk drive (HDD) controller 506, and a short-range communication I/F 508. The image management apparatus 5 further includes a network I/F 511, a keyboard 512, a pointing device 513, a medium I/F 515, an external device connection I/F 516, and a bus line 520.

The CPU 501 controls entire operation of the image management apparatus 5. The ROM 502 stores, for example, a program to boot the CPU 501. The RAM 503 is used as a work area for the CPU 501. The EEPROM 504 reads or writes various data such as an application under control of the CPU 501. The HD 505 stores various data such as a program. The HDD controller 506 reads or writes various data from and to the HD 505 under control of the CPU 501. The image management apparatus 5 may have a hardware configuration that includes a solid state drive (SSD) in alternative to the HD 505 and the HDD controller 506. The short-range communication I/F 508 is a communication circuit for communicating data with communication devices or communication terminals including a wireless communication interface in compliance with the NFC, BLUETOOTH, or WI-FI.

The network I/F 511 is an interface via which the image management apparatus 5 communicates data through the communication network 100. The keyboard 512 is an example of an input device (input means) including a plurality of keys for inputting characters, numerical values, and various instructions. Instead of or in addition to the keyboard 512, the input device (input means) may be implemented by a touch panel for operating buttons or icons. The pointing device 513 is an example of an input device (input means) used to select or execute various instructions, select an item to be processed, or move a cursor being displayed. The medium I/F 515 controls reading or writing (storing) data from or to a storage medium 514 such as a flash memory. The external device connection I/F 516 is an interface to connect the image management apparatus 5 with various external devices. Examples of the external devices include, but are not limited to, a USB memory. Examples of the bus line 520 include, but are not limited to, an address bus and a data bus, which electrically connects the components such as the CPU 501.

Hardware Configuration of Communication Terminal

FIG. 9 is a block diagram illustrating an example hardware configuration of the communication terminal 7 according to an embodiment. As illustrated in FIG. 9, the communication terminal 7 is implemented by, for example, a computer. The communication terminal 7 includes a CPU 701, a ROM 702, a RAM 703, an EEPROM 704, an HD 705, an HDD controller 706, a display 707, a short-range communication I/F 708, a CMOS sensor 709, and an imaging element I/F 710. In the present embodiment, the display 707 functions as an example of a display device (display means). The communication terminal 7 further includes a network I/F 711, a keyboard 712, a pointing device 713, a medium I/F 715, an external device connection I/F 716, a sound input/output I/F 717, a microphone 718, a speaker 719, and a bus line 720.

The CPU 701 controls entire operation of the communication terminal 7. The ROM 702 stores, for example, a program to boot the CPU 701. The RAM 703 is used as a work area for the CPU 701. The EEPROM 704 reads or writes various data such as an application under control of the CPU 701. The HD 705 stores various data such as a program. The HDD controller 706 reads or writes various data from or to the HD 705 under control of the CPU 701. The communication terminal 7 may have a hardware configuration that includes an SSD in alternative to the HD 705 and the HDD controller 706. The display 707 displays various information such as a cursor, a menu, a window, characters, or an image. In the present embodiment, the display 707 functions as an example of a display device (display means) in the present embodiment. The short-range communication I/F 708 is a communication circuit for communicating data with communication devices or communication terminals including a wireless communication interface in compliance with the NFC, BLUETOOTH, or WI-FI. The CMOS sensor 709 is an example of a built-in imaging device (imaging means) to acquire image data or video data by capturing a subject under control of the CPU 701. The imaging device (imaging means) may be a CCD sensor in place of the CMOS sensor. The imaging element I/F 710 is a circuit that controls driving of the CMOS sensor 709.

The network I/F 711 is an interface via which the communication terminal 7 communicates data through the communication network 100. The keyboard 712 is an example of an input device (input means) including a plurality of keys for inputting characters, numerical values, and various instructions. Instead of or in addition to the keyboard 712, the input device (input means) may be implemented by a touch panel for operating buttons or icons. The pointing device 713 is an example of an input device (input means) used to select or execute various instructions, select an item to be processed, or move a cursor being displayed. The medium I/F 715 controls reading or writing (storing) data from or to a storage medium 714 such as a flash memory. The external device connection I/F 716 is an interface for connecting the communication terminal 7 to various external devices. Examples of the external devices include, but are not limited to, a USB memory. The sound input/output I/F 717 is a circuit for inputting or outputting an audio signal between the microphone 718 and the speaker 719 under control of the CPU 701. The microphone 718 is a built-in circuit that converts sound into electrical signals. The microphone 718 acquires sound and sound waves emitted from an external speaker, etc., and acquires information using electrical signals. The speaker 719 is a built-in circuit that generates sound such as music or speech (voice) by converting an electrical signal into physical vibration. Examples of the bus line 720 include, but are not limited to, an address bus and a data bus, which electrically connects the components such as the CPU 701.

The programs may be distributed as files in an installable or executable format stored in a computer-readable storage medium or downloaded through a network. Examples of the storage medium include, but are not limited, a compact disc-recordable (CD-R), a digital versatile disc (DVD), a BLU-RAY disc, a secure digital (SD) card, and a USB memory. Such storage medium may be provided in the form of a program product to users within a certain country or outside that country. For example, the image capturing device 3 implements an image capturing processing method according to the present disclosure by executing a program according to the present disclosure.

Functional Configuration of Image Management System

Figure 10A:
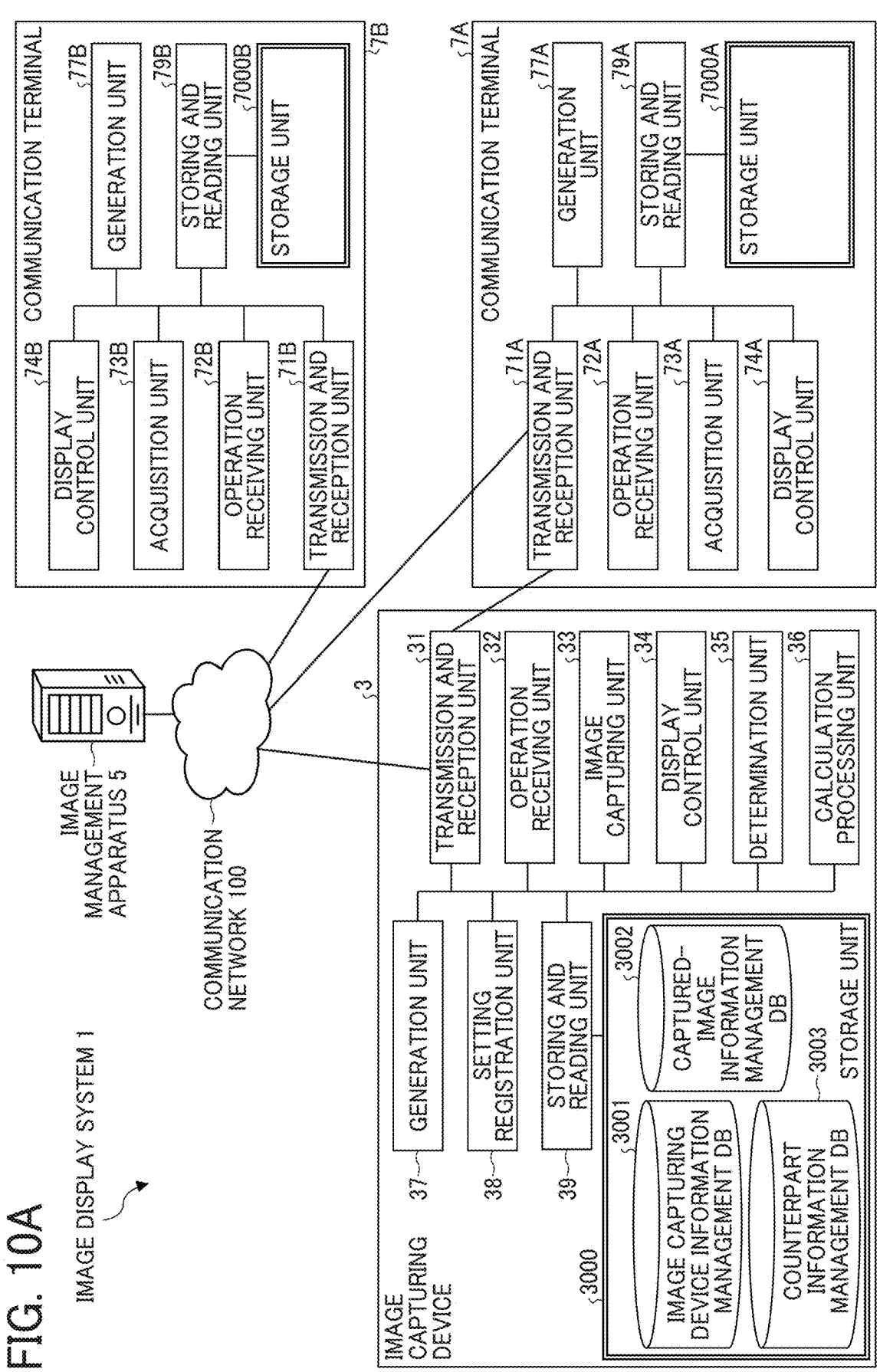
FIG. 10A is a block diagram illustrating an example of a functional configuration of the image display system of FIG. 1.

A description is now given of the functional configuration of the present embodiment with reference to FIG. 10A to FIG. 17. FIG. 10A and FIG. 10B are block diagrams illustrating an example of a functional configuration of the image display system 1 according to an embodiment. FIG. 10A and FIG. 10B illustrate elements related to processing or operation to be described below, out of apparatuses, devices, and communication terminals illustrated in FIG. 1.

Functional Configuration of Image Capturing Device

Referring to FIG. 10A, a functional configuration of the image capturing device 3 is described below. As illustrated in FIG. 10A, the image capturing device 3 includes a transmission and reception unit 31, an operation receiving unit 32, an image capturing unit 33, a display control unit 34, a determination unit 35, a calculation processing unit 36, a generation unit 37, a setting registration unit 38, and a storing and reading unit 39. Each of the functional units is implemented by one or more of the hardware resources illustrated in FIG. 7. The one or more of the hardware resources operate in response to an instruction from the CPU 311 according to a program for the image capturing device 3 loaded from the ROM 312 to the DRAM 314. The image capturing device 3 includes a storage unit 3000 implemented by the ROM 312 illustrated in FIG. 7. The storage unit 3000 is an example of storing means. For example, a communication program (communication application) for performing communication with the communication terminal 7 using the UVC protocol is installed and stored in the storage unit 3000. The storage unit 3000 further stores captured-image related information relating to a captured image including the surroundings of the image capturing device 3 captured at the local site.

Each Functional Unit of Image Capturing Device

A description is now given of each of the functional units of the image capturing device 3 in detail. The transmission and reception unit 31 of the image capturing device 3 illustrated in FIG. 10A is implemented by processing performed by the CPU 311 with respect to the external device connection I/F 316 and the communication device 317. In the case of communication using the external device connection I/F 316, the transmission and reception unit 31 transmits and receives various types of data or information to and from the communication terminal 7 using the UVC protocol. The transmission and reception unit 31 transmits generated preview screen data to the communication terminal 7A (the local site terminal) using the UVC protocol such that a preview screen is displayed at the communication terminal 7B (the remote site terminal). The transmission and reception unit 31 adds distance information indicating a distance to the preview screen data and transmits the preview screen data to which the distance information is added to the communication terminal 7A (local site terminal) using the UVC protocol. Further, the transmission and reception unit 31 adds resolution information indicating the performance of the image capturing device 3 to the preview screen data and transmits the preview screen data to which the resolution data is added to the communication terminal 7A (the local site terminal) using the UVC protocol.

In the present embodiment, the transmission and reception unit 31 functions as an example of at least one of preview screen data transmitting means and receiving means.

The operation receiving unit 32 is implemented by the CPU 311 processing signals generated by various operations received by the operation device 315. The operation receiving unit 32 detects various operations to the image capturing device 3. In the present embodiment, the operation receiving unit 32 functions as an example of receiving means.

The image capturing unit 33 is implemented by processing performed by the CPU 311 with respect to the imaging unit 301, the image processor 304, and the imaging controller 305. The image capturing unit 33 captures an image of the surroundings of the image capturing device 3 to acquire a captured image of the local site. Further, the image capturing unit 33 monitors a change in the surrounding at the local site. When the monitoring result indicates that there is a change between the captured image of the local site and an image of the local site after the elapse of a predetermined time period, the image capturing unit 33 captures the surroundings of the image capturing device 3 again to acquire a re-captured image of the local site. In the present embodiment, the image capturing unit 33 functions as an example of image capturing means.

The display control unit 34 is implemented by processing performed by the CPU 311. The display control unit 34 controls display on, for example, the display of the communication terminal 7 (communication terminal 7B) at the remote site. In the present embodiment, the display control unit 34 functions as an example of display control means.

The determination unit 35 is implemented by processing performed by the CPU 311. The determination unit 35 performs various determinations in the image capturing device 3. In the present embodiment, the determination unit 35 functions as an example of determining means.

The calculation processing unit 36 is implemented by processing performed by the CPU 311. The calculation processing unit 36 calculates coordinate information relating to captured-image data captured by the image capturing device 3. The calculation processing unit 36 performs image processing for generating an image corresponding to the display mode. Specifically, the calculation processing unit 36 performs predetermined processing on the captured image that can be displayed at the communication terminal 7B (remote site terminal) used at the remote site where the captured image of the local site is shared, on the basis of a predetermined display mode and the image processing setting file for performing the predetermined processing on the captured image. Further, the calculation processing unit 36 measures the distance between the image capturing device 3 and a subject imaged by the image capturing device 3. Specifically, the calculation processing unit 36 calculates distance information of an object to be imaged that is present in the local site or the remote site. In the present embodiment, the calculation processing unit 36 functions as an example of calculating means and an example of distance measuring means.

The generation unit 37 is implemented by processing performed by the CPU 311. The generation unit 37 generates an image corresponding to a display mode. The generation unit 37 generates preview screen data representing a preview screen of a processed image obtained by performing processing on the captured image by the calculation processing unit 36. Further, the generation unit 37 generates preview screen data obtained by performing processing of blurring the entire captured image or a particular part of the captured image as the predetermined processing. In the present embodiment, the generation unit 37 functions as an example of preview screen data generating means.

The setting registration unit 38 is implemented by processing by the CPU 311. The setting registration unit 38 identifies event counterpart information of, for example, a web conference, and registers the identified event counterpart. In the present embodiment, the setting registration unit 38 functions as an example of setting means and an example of registration means.

The storing and reading unit 39 is implemented by processing by the CPU 311 with respect to the ROM 312. The storing and reading unit 39 stores various data or information in the storage unit 3000 or reads various data or information from the storage unit 3000. In the present embodiment, the storing and reading unit 39 functions as an example of storing and reading means.

Image Capturing Device Information Management Table

FIG. 11 is a conceptual diagram illustrating an example of an image capturing device information management table according to an embodiment. The structure and content of the data table described below is one example, and the present disclosure is not limited thereto. In the storage unit 3000, an image capturing device information management database (DB) 3001 is stored, for example, in the form of the image capturing device information management table as illustrated in FIG. 11. In the image capturing device information management table, an image capturing device information (performance information) are stored and managed in association with each other for each image capturing device identifier (ID).

The image capturing device ID is identification information for identifying the image capturing device 3. The image capturing device name is a name representing the image capturing device. The image capturing device information includes performance information indicating the performance of the image capturing device. The performance information is, for example, resolution represented by dot per inch (dpi).

In the present embodiment, the image capturing device information management table (image capturing device information management DB 3001) functions as an example of image capturing device information managing means.

Captured-Image Information Management Table

FIG. 12 is a conceptual diagram illustrating an example of a captured-image information management table according to an embodiment. The structure and content of the data table described below is one example, and the present disclosure is not limited thereto. In the storage unit 3000, a captured-image information management DB 3002 is stored, for example, in the form of the captured-image information management table as illustrated in FIG. 12. In the captured-image information management table, a captured image ID, an image capturing date and time, captured-image data, and distance information are stored and managed in association with each other for each tab having an image capturing device ID.

The captured image ID is identification information for identifying a captured image captured by the image capturing device 3. The image capturing date and time is date and time information indicating a date and time when the image capturing device 3 captures the corresponding captured image. The captured-image data is a name indicating an image that is present at a predetermined position or in a predetermined area included in the captured image (panoramic image) captured by the image capturing device 3. The captured-image data is, for example, a whiteboard image, a wall image 1, or a wall image 2. The distance information indicates a distance (an image capturing distance) from the image capturing device 3 to a participant at the local site or the remote site or the captured-image data.

In the present embodiment, the captured-image information management table (captured-image information management DB 3002) functions as an example of captured-image information managing means.

Counterpart Information Management Table

FIG. 13 is a conceptual diagram illustrating an example of a counterpart information management table according to an embodiment. The structure and content of the data table described below is one example, and the present disclosure is not limited thereto.

In the storage unit 3000, a counterpart information management DB 3003 is stored, for example, in the form of the counterpart information management table as illustrated in FIG. 13. In the counterpart information management table, a counterpart site ID, an event date and time, and event counterpart information are stored and managed in association with each other for each tab having the image capturing device ID.

The counterpart site ID is identification information for identifying a counterpart site that participates in, for example, a web conference. The event date and time is date and time information indicating a date and time when an event such as a web conference to be held with the counterpart site is held. The event counterpart information indicates information of a counterpart which participates in an event such as a web conference. The event counterpart information includes a counterpart name, an e-mail address of the counterpart, and an event link (event name). In the counterpart information management table, information of the counterpart at the remote site can be grasped by managing the event counterpart information described above.

In the present embodiment, the counterpart information management table (counterpart information management DB 3003) functions as an example of counterpart information managing means.

Functional Configuration of Communication Terminal

Referring again to FIG. 10A, a description is now given of the functional configuration of the communication terminal 7. As illustrated in FIG. 10A, the communication terminal 7 includes a transmission and reception unit 71A (B), an operation receiving unit 72A (B), an acquisition unit 73A (B), a display control unit 74A (B), a generation unit 77A (B), and a storing and reading unit 79A (B). Each of the functional units is implemented by one or more of the hardware resources illustrated in FIG. 7. The one or more hardware resources operate in response to an instruction from the CPU 701 according to a program for the communication terminal 7 loaded to the RAM 703 from at least one of the ROM 702, the EEPROM 704, the HD 705, and the storage medium 714. The communication terminal 7 further includes a storage unit 7000 implemented by at least one of the ROM 702, the EEPROM 704, the HD 705, and the storage medium 714 illustrated in FIG. 9. The storage unit 7000 is an example of storing means. Further, for example, a communication program (communication application) for communicating with the image capturing device 3 using the UVC protocol and a teleconference application for performing a web conference with the communication terminal 7 at the counterpart site are stored in the storage unit 7000.

Each Functional Unit of Communication Terminal

A description is now given of each of the functional units of the communication terminal 7 in detail. In the present embodiment, the suffixes A and B of the functional units of the communication terminal 7 are omitted unless otherwise specified. The transmission and reception unit 71A of the communication terminal 7A illustrated in the FIG. 10A is implement by processing performed by the CPU 701 with respect to the short-range communication I/F 708 and the network I/F 711. The transmission and reception unit 71A transmits the image processing setting file transmitted by the image management apparatus 5 to the image capturing device 3. In the present embodiment, the transmission and reception unit 71A functions as an example of at least one of transmission means and receiving means.

The operation receiving unit 72 is implemented by processing by the CPU 701 with respect to one or more of the display 707, the keyboard 712, and the pointing device 713. The operation receiving unit 72 receives various operations at the communication terminal 7. In the present embodiment, the operation receiving unit 72 functions as an example of operation receiving means.

The acquisition unit 73 is implemented by processing performed by the CPU 701. The acquisition unit 73 acquires the captured-image related information indicating the captured image captured by the image capturing device 3. In the present embodiment, the acquisition unit 73 functions as an example of calculating means and an example of processing means. In the present embodiment, the acquisition unit 73 functions as an example of acquiring means.

The display control unit 74 is implemented by processing by the CPU 701 with respect to the display 707. The display control unit 74 controls the communication terminal 7 to display a captured image (a panoramic image and/or a close-up image) of the counterpart site on the display 707

(display means). In the present embodiment, the display control unit 74 is as an example of display control means.

The generation unit 77 is implemented by processing performed by the CPU 701. The generation unit 77 generates preview screen data (screen data relating to a capture image on which a predetermined processing has been performed) at each site to be displayed by the communication terminal 7. In the present embodiment, the generation unit 77 functions as an example of generating means.

The storing and reading unit 79 is implemented by processing performed by the CPU 701 with respect to at least one of the ROM 702, the EEPROM 704, the HD 705, and the storage medium 714. The storing and reading unit 79 stores various data or information in the storage unit 7000 or reads various data or information from the storage unit 7000. In the present embodiment, the storing and reading unit 79 functions as an example of storing and reading means.

Functional Configuration of Image Management Apparatus

A description is now given of the functional configuration of the image management apparatus 5. FIG. 10B is a block diagram illustrating an example of a functional configuration of the image display system 1 according to an embodiment. As illustrated in FIG. 10B, the image management apparatus 5 includes a transmission and reception unit 51A, an extraction/acquisition unit 53, a display control unit 54, a determination unit 55, an area identifying unit 56, a generation unit 57, a setting registration unit 58, and a storing and reading unit 59. Each of the functional units is implemented by one or more of the hardware resources illustrated in FIG. 8. The one or more hardware resources operate in response to an instruction from the CPU 501 according to a program for the image management apparatus 5 loaded to the RAM 503 from at least one of the ROM 502, the EEPROM 504, the HD 505, and the storage medium 514. The image management apparatus 5 further includes a storage unit 5000 implemented by at least one of the ROM 502, the EEPROM 504, the HD 505, and the storage medium 514 illustrated in FIG. 8. Further, for example, a communication program (communication application) for performing communication with the apparatuses and the terminals through the communication network 100 and a browser application are installed and stored in the storage unit 5000.

Each Functional Unit of Image Management Apparatus

A description is now given of each of the functional units of the image management apparatus 5 in detail. The transmission and reception unit 51 of the image management apparatus 5 illustrated in FIG. 10A is implemented by processing performed by the CPU 501 with respect to the network I/F 511 and the short-range communication I/F 508. The transmission and reception unit 51 transmits and receives various data or information to and from the terminals and devices through the communication network 100. Further, the transmission and reception unit 51 receives captured-image related information relating to a captured image of the local site that is captured by the image capturing device 3 and transmitted by the communication terminal 7 (communication terminal 7A). Furthermore, the transmission and reception unit 51 transmits the generated image processing setting file via the communication terminal 7 (communication terminal 7A) such that the image capturing device 3 configures settings according to the image processing setting file. In the present embodiment, the transmission and reception unit 51 functions as an example of at least one of image processing setting file transmitting means and captured-image related information receiving means.

The extraction/acquisition unit 53 is implemented by processing performed by the CPU 501. The extraction/ acquisition unit 53 extracts confidential information candidate included in the captured-image related information transmitted by the image capturing device 3. Further, the extraction/acquisition unit 53 checks the distance information included in the captured-image related information that is transmitted and acquired from the communication terminal 7A. Furthermore, the extraction/acquisition unit 53 checks text information included in the target range in the captured image on the basis of the performance information of the image capturing device 3 and the distance information. The extraction/acquisition unit 53 further searches for a synonym of the extracted information (keyword). In the present embodiment, the extraction/acquisition unit 53 functions as an example of extracting and acquiring means.

The display control unit 54 is implemented by processing performed by the CPU 501 with respect to the display 507 or the communication terminal 7 connected through the communication network 100. The display control unit 54 performs display control of various screens and information or data with respect to the image management apparatus 5. Further, the display control unit 54 displays a display screen generated by, for example, a hypertext markup language (HTML) on the display 707 of the communication terminal 7 using, for example, a web browser. Furthermore, the display control unit 54 activates and executes a launcher and an external application that operate on an operating system (OS), to display various screens generated by an application programming interface (API) provided by the OS on the display 507 or the display of the communication terminal 7. In the present embodiment, the display control unit 54 functions as an example of display control means.

The determination unit 55 is implemented by processing performed by the CPU 501. The determination unit 55 performs the entire determination processing at the image management apparatus 5. In the present embodiment, the determination unit 55 functions as an example of determining means.

The area identifying unit 56 is implemented by processing performed by the CPU 501. The area identifying unit 56 identifies an area of the confidential information candidate included in the captured image of the local site transmitted by the image capturing device 3. In the present embodiment, the area identifying unit 56 functions as an example of identifying means.

The generation unit 57 is implemented by processing performed by the CPU 501. The generation unit 57 generates various information at the image management apparatus 5. Further, the generation unit 37 generates confidential information determination data and the image processing setting file (setting information program) based on the search result by the image management apparatus 5. In the present embodiment, the generation unit 57 functions as an example of generating means.

The setting registration unit 58 is implemented by processing performed by the CPU 501. The setting registration unit 58 sets various information at the image management apparatus 5. Further, the setting registration unit 58 registers captured image information in a captured-image information management DB 5001 managed by the image management apparatus 5. In the present embodiment, the setting registration unit 58 functions as an example of setting means and an example of registration means.

The storing and reading unit 59 is implemented by processing performed by the CPU 501 with respect to at least one of the ROM 502, the EEPROM 504, the HD 505, and the storage medium 514. The storing and reading unit 59 stores various data or information in the storage unit 5000 or reads various data or information from the storage unit 5000. In the present embodiment, the storing and reading unit 59 functions as an example of storing and reading means.

Captured-Image Information Management Table

FIG. 14 is a conceptual diagram illustrating an example of a captured-image information management table according to an embodiment. The structure and content of the data table described below is one example, and the present disclosure is not limited thereto. In the storage unit 5000, the captured-image information management DB 5001 is stored, for example, in the form of the captured-image information management table as illustrated in FIG. 14. In the captured-image information management table, a captured image ID, an image capturing date and time, a confidential information candidate ID, captured-image data, and distance information (image capturing distance) are stored and managed in association with each other for each tab having an image capturing device ID.

The confidential information candidate ID is identification information for identifying a candidate of confidential information, and is associated with the captured-image data. The distance information is a distance from the image capturing device 3 with respect to the captured-image data.

In the present embodiment, the captured-image information management table (captured-image information management DB 5001) functions as an example of captured-image information managing means and an example of metadata managing means.

Confidential Information Management Table

FIG. 15 is a conceptual diagram illustrating an example of a confidential information management table according to an embodiment. The structure and content of the data table described below is one example, and the present disclosure is not limited thereto. In the storage unit 3000, a confidential information management DB 5002 is stored, for example, in the form of the confidential information management table as illustrated in FIG. 15. In the confidential information management table, a data ID, a keyword (text information), a synonym 1, a synonym 2, a synonym 3, a synonym 4, and a confidential information candidate are stored and managed in association with each other for each tab having the confidential information candidate ID. The number of synonyms is not limited to the above-described example.

The data ID is identification information for identifying data such as text information and image information included in the captured-image data associated with the confidential information candidate ID. The keyword (text information) indicates a keyword included in the captured-image data. The keyword includes contents to be handled as confidential information in some cases, such as "budget amount," and "development member carrier with company." The synonym is a word indicating the keyword or a partial word included in the keyword. The confidential information candidate indicates a result of determination in the process performed by the image management apparatus 5. The confidential information candidate is indicated by "candidate" or "non-candidate."

In the present embodiment, the confidential information management table (confidential information management DB 5002) functions as an example of confidential information managing means.

Disclosure Permission Management Table

FIG. 16 is a conceptual diagram illustrating an example of a disclosure permission management table according to an embodiment. The structure and content of the data table described below is one example, and the present disclosure is not limited thereto. In the storage unit 5000, a disclosure permission management DB 5003 is stored, for example, in the form of the disclosure permission management table as illustrated in FIG. 16. In the disclosure permission management table, items of the data ID, the keyword (text information), a search result, a non-disclosure agreement, and disclosure permission determination are stored and managed in association with each other for each tab having the counterpart name. The number of synonyms is not limited to the above-described example.

The counterpart name indicates the name of a counterpart which participates in, for example, a web conference at the remote site that shares, for example, an image with the local site. The search result indicates a result of searching for a synonym by referring to the above-described confidential information management table. "Synonym present" is registered when a synonym is present, and "no synonym" is registered when no synonym is present. The non-disclosure agreement indicates whether a non-disclosure agreement is concluded between a participant (e.g., a company) at the local site and a participant (e.g., a company) at the remote site. "Concluded" is registered when the non-disclosure agreement is concluded, and "not concluded" is registered when the non-disclosure agreement is not concluded. The disclosure permission determination is a flag for registering whether to disclose the corresponding keyword depending on the search result and the non-disclosure agreement. Accordingly, the image management apparatus 5 assigns "permitted" as the flag of the disclosure permission determination when the disclosure is to be permitted and assigns "not permitted" as the flag of the disclosure permission determination when the disclosure is not to be permitted. When performing the disclosure permission determination, a keyword that is usually used and unlikely to relate to confidential information, such as "a date for the next event" is excluded from the selection of the keyword.

In the present embodiment, the disclosure permission management table (disclosure permission management DB 5003) functions as an example of disclosure permission managing means.

Processing Method Management Table

FIG. 17 is a conceptual diagram illustrating an example of a processing method management table according to an embodiment. The structure and content of the data table described below is one example, and the present disclosure is not limited thereto. In the storage unit 3000, a processing method management DB 5004 is stored, for example, in the form of the processing method management table as illustrated in FIG. 17. In the processing method management table, the data ID, the keyword (text information), the disclosure permission determination, and processing information are stored and managed in association with each other for each tab having the confidential information candidate ID.

The processing information is information indicating predetermined processing to be performed on a keyword for which the disclosure permission determination is "not permitted" among the confidential information candidates. As the processing information, information indicating whether to perform "blurring processing" and a "range to be blurred" are managed. The "range to be blurred" includes the entire captured-image data and only a particular keyword in the captured-image data depending on, for example, the display modes.

In the present embodiment, the processing method management table (processing method management DB 5004) functions as an example of processing method managing means.

Processes or Operation of Embodiment

Figure 18:
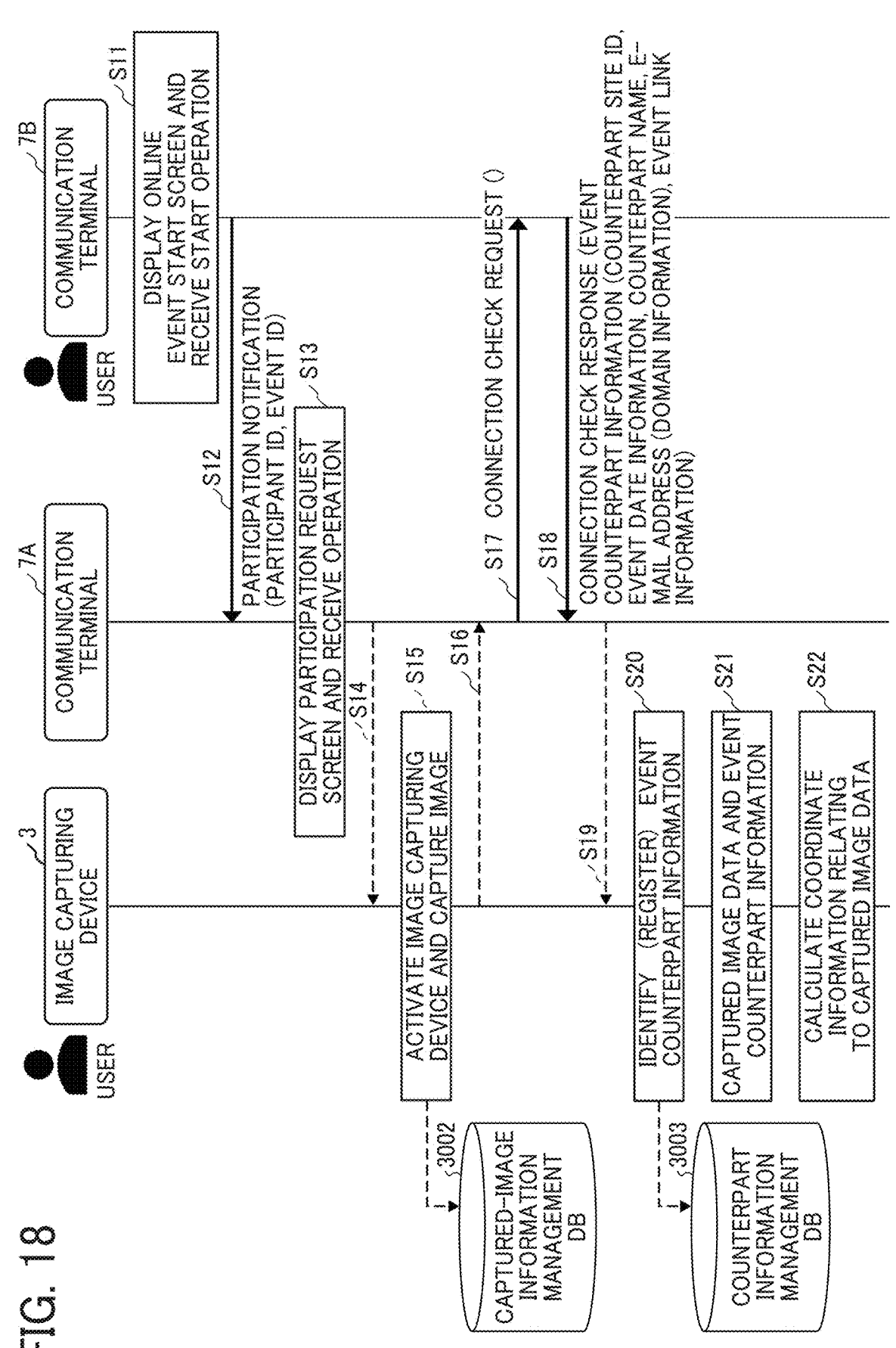
FIG. 18 is a sequence diagram illustrating an example of an overall operation including an image capturing operation, according to an embodiment.

Referring now to FIG. 18 to FIGS. 24A to 24D, a description is given of processes and operations performed by the image display system 1 (image management system 2), according to an embodiment. FIG. 18 is a sequence diagram illustrating an example of an overall operation including an image capturing operation, according to an embodiment. In the present embodiment, the description is given on the assumption that each of the communication terminal 7A and the communication terminal 7B activates an application for login processing and the communication terminal 7A and the communication terminal 7B establishes a communication session. In other words, the description is given on the assumption that the communication terminal 7A at the local site and the communication terminal 7B at the remote site can communicate with each other.

Referring to FIG. 18, a usage scenario is described in which a participation notification for an online event (e.g., an online conference) is transmitted from the communication terminal 7B at the remote site to the communication terminal 7A at the local site and the online conference is started. First, the communication terminal 7B at the remote site displays an online conference start screen and receives a start operation (step S11). Specifically, the display control unit 74B controls the display 707 to display a preview screen described below. Subsequently, the operation receiving unit 72B receives the start operation input by a participant at the remote site.

Then, a participant who is to participate in a certain online conference using the communication terminal 7B at the remote site operates a participation start screen displayed on the communication terminal 7B and operates a participation button for participating in the online conference. In response to the operation, the transmission and reception unit 71B of the communication terminal 7B transmits a notification (participation notification) indicating participation in the online conference to the communication terminal 7A of the local site (step S12). Thus, the transmission and reception unit 71A of the communication terminal 7A receives the participation notification transmitted by the communication terminal 7B. The participation notification includes a participant ID of a participant who first participates in the online conference at the remote base and an event ID for identifying the online conference.

Then, the display control unit 74A of the communication terminal 7A at the local site displays a participation request screen, and the operation receiving unit 72A of the communication terminal 7A receives an operation input by a participant at the local site (step S13). Specifically, the display control unit 74A controls the display 707 of the communication terminal 7A at the local site to display the participation request screen. Subsequently, the operation receiving unit 72A receives, for example, a selection of the image capturing device by the participant and various button operations relating to the start of the conference. An example of the participation request screen is described below.

Example of Display Screen

FIG. 19 is a diagram illustrating an example of the participation request screen, according an embodiment. FIG. 19 illustrates a participation request screen 7111 displayed by the display control unit 74A. The participation request screen 7111 is, for example, a screen generated by the application activated at the communication terminal 7A. On the participation request screen 7111, an application name, an online event name, an event date and time (current date and time), an image capturing device selection field, a conference start button 7151, and a cancel button 7152 are displayed. The participation request screen 7111 may further include a notification indicating that a participant at the remote site has participated in the online conference.

The image capturing device selection field includes a list of image capturing devices including the image capturing device 3 used in the online conference in advance. This allows the participant (user) participating in the online conference to select the image capturing device 3 used at the local site by putting a mark in the checkbox. The participation request screen 7111 of FIG. 19 illustrates a case in which a 360-degree camera 1 in the image capturing device selection field is being selected by the participant. At this time, the display control unit 74A may set the check boxes of the other image capturing devices unselectable. This prevents multiple image capturing devices from being selected. However, when multiple image capturing devices are used in an online conference, the display control unit 74A may set the check boxes of the other image capturing devices selectable. In other words, the display control unit 74A may display the image capturing device selection field in which multiple image capturing devices can be selected.

After the participant (user) selects a desired image capturing device, the selected image capturing device is determined in response to an operation to the conference start button 7151. Then, the processes of subsequent steps are performed.

Image Capturing Operation

Referring again to FIG. 18, the transmission and reception unit 71A of the communication terminal 7A transmits connection information with the image capturing device 3 to the image capturing device 3 using the UVC protocol (step S14). Thus, the transmission and reception unit 31 of the image capturing device 3 receives the connection information with the image capturing device 3 transmitted by the communication terminal 7A.

Subsequently, the operation receiving unit 32 and the image capturing unit 33 of the image capturing device 3 performs activation of the image capturing device and image capturing (step S15). Specifically, the operation receiving unit 32 receives activation of the image capturing device 3 by the participant (user) at the local site, and the image capturing unit 33 acquires a captured image of the local site by capturing an image of the surroundings of the image capturing device 3. At this time, the calculation processing unit 36 measures the distance between the image capturing device 3 and a subject imaged by the image capturing device 3. Subsequently, the setting registration unit 38 registers the captured-image related information relating to the acquired captured image in the items corresponding to the image capturing device ID managed in the captured-image information management DB 3002 (sec FIG. 12).

Then, the transmission and reception unit 31 transmits a response to the information transmitted in step S14 to the communication terminal 7A using the UVC protocol (step S16). Thus, the transmission and reception unit 71A of the communication terminal 7A receives the response transmitted by the image capturing device 3.

Subsequently, the transmission and reception unit 71A of the communication terminal 7A transmits a connection check request to the communication terminal 7B (step S17). Thus, the transmission and reception unit 71B of the communication terminal 7B receives the connection check request transmitted by the communication terminal 7A. The process of step S17 is performed, for example, when domain information of the participant cannot be recognized even by searching for a participant ID such as an e-mail addresses received in step S12.

It is assumed that before the process of step S17 is performed, the communication terminal 7B acquires in advance conference information relating to an online event to be conducted from a conference management server (e.g., a cloud service of a conference application) connected through the communication network 100. Thus, the communication terminal 7B is a communication terminal that has acquired the conference information relating to the online event to be conducted.

Then, the transmission and reception unit 71B of the communication terminal 7B transmits a connection check response to the communication terminal 7A as a response to the connection check request received in step S17 (step S18).

Thus, the transmission and reception unit 71A of the communication terminal 7A receives the connection check response transmitted by the communication terminal 7B. The connection check response includes the event counterpart information including, for example, the counterpart site ID, the event date and time information, the counterpart name, the e-mail address (domain information), and event link information.

Various information such as the online conference information transmitted and received between the communication terminal 7B and the communication terminal 7A in the processes of transmitting the connection check request in step S17 and transmitting the connection check response in step S18 may be collectively transmitted from the communication terminal 7B to the communication terminal 7A in the process of step S12 described above.

Subsequently, the transmission and reception unit 71A of the communication terminal 7A transmits the connection check response to the image capturing device 3 using the UVC protocol (step S19). Thus, the transmission and reception unit 31 of the image capturing device 3 receives the connection check response transmitted by the communication terminal 7A.

Then, the setting registration unit 38 of the image capturing device 3 identifies (registers) event counterpart information (step S20). Specifically, the setting registration unit 38 registers the event counterpart information (the counterpart site ID, the event date and time information, the counterpart name, the e-mail address (domain information), and the event link information) included in the connection check response received in step S19 in the corresponding items of the counterpart information management DB 3003 (see FIG. 13).

Then, the calculation processing unit 36 combines the captured-image data and the event counterpart information (step S21). Specifically, the calculation processing unit 36 combines the captured-image data included in captured-image related information relating to the captured image registered in step S15 and the event counterpart information registered in step S20.

Then, the calculation processing unit 36 calculates coordinate information relating to the captured-image data (step S22). Specifically, the calculation processing unit 36 calculates coordinate information (coordinate information of each of the start point and the end point) of a rectangle indicating a frame of the captured-image data (e.g., the whiteboard image) captured and acquired in step S15. For example, the coordinates are calculated by giving X-Y coordinates with any one of vertices of the rectangular frame of the entire panoramic image illustrated in FIG. 3 as an origin and giving each vertex of a rectangular frame indicating the area of the captured-image data in the X-Y coordinates as each coordinate value.

In the image display system according to the present embodiment, for example, when the processes of steps S12 and S16 described above are performed, another apparatus such as an online conference server (remote conference server) may reside between the communication terminal 7A at the local site and the communication terminal 7B at the remote site. In other words, the information or data exchanged between the communication terminal 7A at the local site and the communication terminal 7B at the remote site may be exchanged via another apparatus. With this configuration, the communication terminal 7A and the communication terminal 7B receives predetermined online conference information from the online conference server and participates in the online conference conducted between the local site and the remote site. The above-described configuration can be applied even when another or other processing steps are performed between the communication terminal 7A at the local site and the communication terminal 7B at the remote site.

The description given above with reference to FIG. 18 is of the usage scenario in which the participation notification for the online event (e.g., online conference) is transmitted from the communication terminal 7B at the remote site to the communication terminal 7A at the local site and then the online conference is started. In another case, the participation notification for an online event (e.g., online conference) may be transmitted from the communication terminal 7A at the local site to the communication terminal 7B at the remote site and then the online conference is started. In this case, the above-described process of step S11 is performed by the communication terminal 7A at the local site. In this case, however, the process of step S12 described above does not have to be performed.

Subsequently, the processes of steps S13 to S16 are performed in the same or substantially the same manner.

Then, in step S17, the communication terminal 7A transmits, to the communication terminal 7B, information including the participant ID and the event ID of the local site included in the participation notification performed in step S12, instead of the connection check request. The subsequent processes of steps S18 to S22 are performed in the same or substantially the same manner as described above with reference to FIG. 18.

Various Processing on Captured Image

Figure 20:
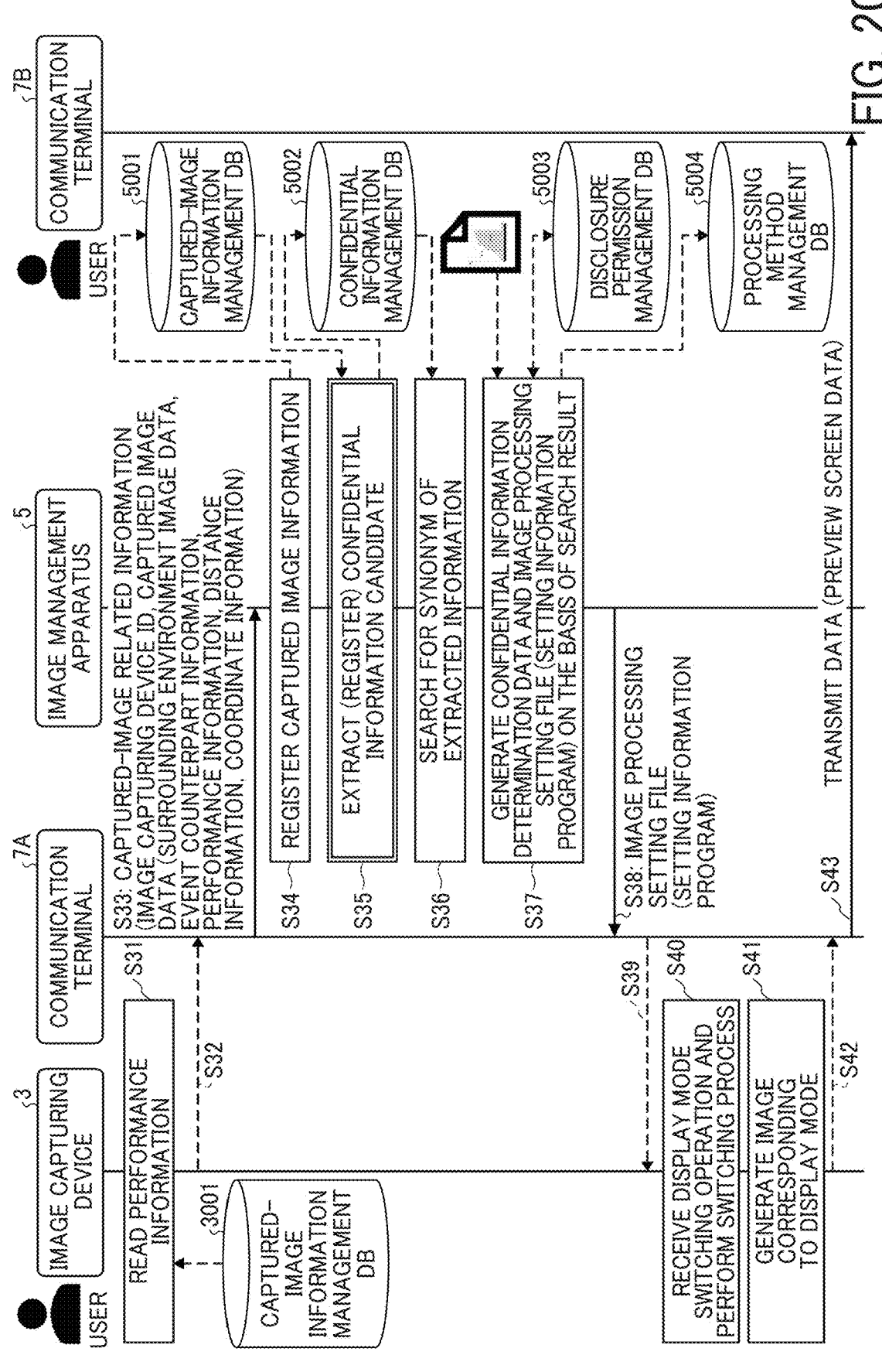
FIG. 20 is a sequence diagram illustrating an example of an overall operation including processing on a captured image, according to an embodiment.

FIG. 20 is a sequence diagram illustrating an example of an overall operation including processing on a captured image, according to an embodiment. Subsequent to the coordinate calculation process in step S21, the storing and reading unit 39 of the image capturing device 3 reads the capability information of the image capturing device 3 (step S31). Specifically, the storing and reading unit 39 reads resolution information as the capability information of the image capturing device 3 that is managed by the image capturing device information management DB 3001 (see FIG. 11) and is currently being used.

Then, the transmission and reception unit 31 transmits the captured-image related information to the communication terminal 7A (step S32). Specifically, the transmission and reception unit 31 transmits the captured-image related information to the communication terminal 7A using the UVC protocol.

Then, the transmission and reception unit 71A of the communication terminal 7A transmits the captured-image related information to the image management apparatus 5 (step S33). Thus, the transmission and reception unit 51 of the image management apparatus 5 receives the captured-image related information transmitted by the communication terminal 7A. At this time, the captured-image related information includes the image capturing device ID, the captured-image data (surrounding environment image data), the event counterpart information, the performance information, the distance information, and the coordinate information.

Then, the setting registration unit 58 of the image management apparatus 5 registers captured image information (step S34). Specifically, the setting registration unit 58 registers in the corresponding items managed in the captured-image information management DB 5001 (see FIG. 14) on the basis of the image capturing device ID included in the captured-image related information received in step S34.

Extraction (Registration) Operation of Confidential Information Candidate

Then, the extraction/acquisition unit 53 extracts (registers) confidential information candidate (step S35).

Figure 21:
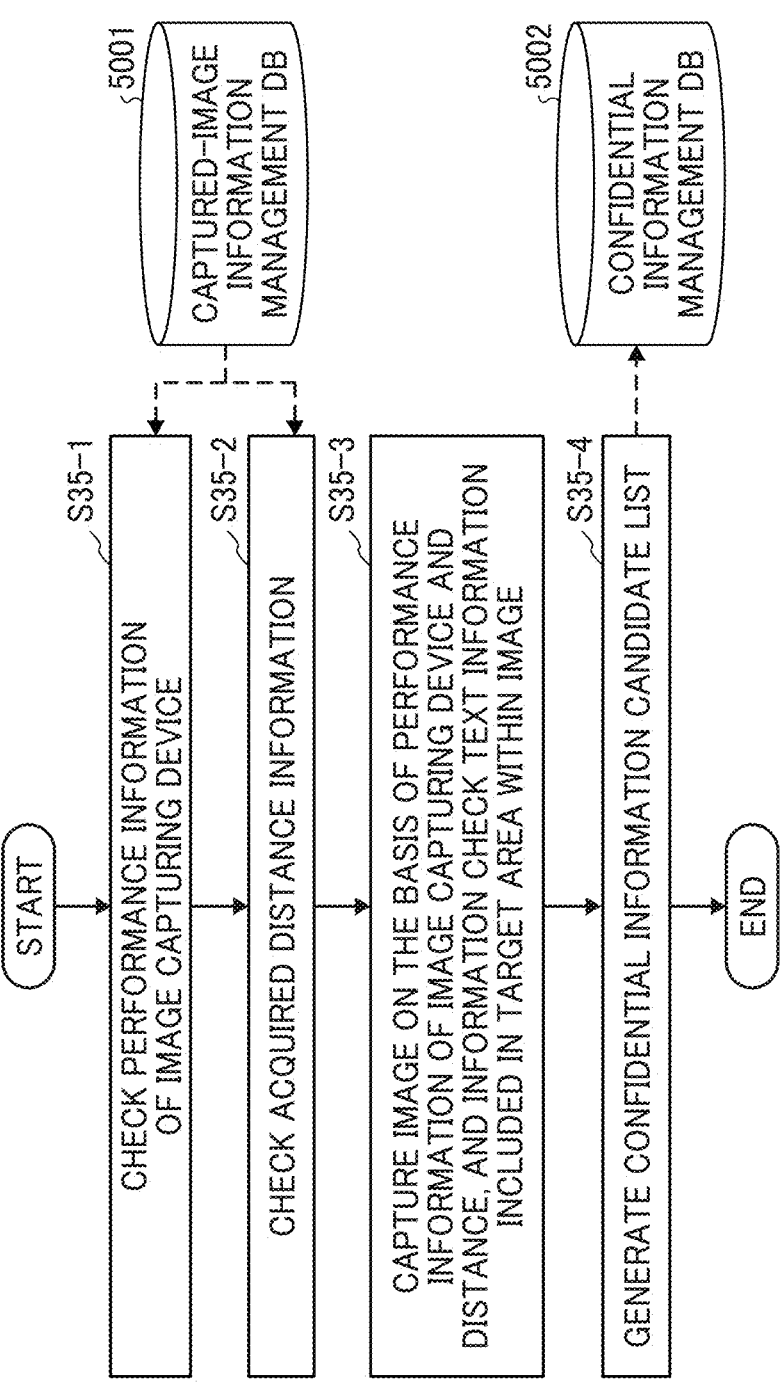
FIG. 21 is a flowchart illustrating an example of an operation of extracting confidential information candidate, according to an embodiment.

Details of Confidential Information Candidate Extraction (Registration) Operation A detailed description is now given of the operation of extracting (registering) confidential information candidate with reference to FIG. 21. FIG. 21 is a flowchart illustrating an example of the operation of extracting confidential information candidate, according to an embodiment. First, the storing and reading unit 59 of the image management apparatus 5 checks the performance information of the image capturing device (step S35-1). Specifically, the storing and reading unit 59 reads resolution information as the performance information associated with the image capturing device ID managed in the captured-image information management DB 5001 (see FIG. 14) from the corresponding tab.

Then, the extraction/acquisition unit 53 checks acquired distance information (step S35-2). Specifically, the extraction/acquisition unit 53 reads all distance information associated with the corresponding captured-image data by searching the captured-image information management DB 5001 using the image capturing device ID as a search key via the storing and reading unit 59.

Then, the extraction/acquisition unit 53 checks text information included in the target range in the captured image on the basis of the performance information of the image capturing device and the distance information (step S35-3). Specifically, the extraction/acquisition unit 53 extracts a confidential information area included in the captured-image data using, for example, an optical character recognition (OCR) technology.

Subsequently, the extraction/acquisition unit 53 checks text information included in the target range in the captured image by using the performance information (resolution information) of the image capturing device read in step 35-1 and the distance information relating to each captured-image data read in step S35-2.

Then, the generation unit 57 generates a confidential information candidate list (step S35-4), and the operation ends. Specifically, the generation unit 57 generates a confidential information candidate on the basis of the text information included in the target range in the captured image checked in step S35-3, and registers the confidential information candidate in the corresponding item of the confidential information management DB 5002 (see FIG. 15).

Synonym Search and Generation of Image Processing File

Referring again to FIG. 20, the extraction/acquisition unit 53 of the image management apparatus 5 searches for a synonym of the extracted information (keyword) (step S36). Specifically, the extraction/acquisition unit 53 performs a synonym search for keywords represented by character information managed in the confidential information management DB 5002 (see FIG. 15), and registers for each keyword whether the keyword is a confidential information candidate. In the synonym search at this time, the extraction/acquisition unit 53 searches whether the searched keyword corresponds to confidential information.

When performing the search of whether the keyword corresponds to the confidential information, the extraction/acquisition unit 53 may refer to information (counterpart information) of the remote site that share information with the local site.

Then, the generation unit 57 generates confidential information determination data based on the search result and the image processing setting file (setting information program) (step S37). Specifically, the generation unit 57 generates confidential information determination data, an example of which is a permission/prohibition flag of the disclosure permission determination for each keyword on which the synonym search has been performed. More specifically, the generation unit 57 generates the confidential information determination data based on the search result by using conceptual diagram data indicating an example of the relation between the resolution and the target distance as illustrated in FIG. 5 and disclosure permission determination result associated with the synonym search. At this time, the generation unit 37 may generate new data specifying an area of image data in which the confidential information determination data is included in cooperation with the area identifying unit 56. The generation unit 37 generates the image processing setting file on the basis of particular keyword information and the presence of a non-disclosure agreement between an entity at the local site and an entity at the remote site. Further, the generation unit 57 generates the image processing setting file as an image processing setting file as a setting information program relating to a display mode executed by the image capturing device 3, and registers processing information such as "blurring processing" to be performed for each keyword in the items of the processing information management in the processing method management DB 5004 (see FIG. 17).

In a case where the image capturing device 3 supports multiple display modes, the setting information program is generated such that different processing methods can be set according to a display mode set by the display control unit 34 of the image capturing device 3. For example, in a case where the image capturing device 3 that supports a display mode including a close-up screen is used, the setting information program is generated such that an area on which processing is performed is minimized as much as possible by setting a target area to only the confidential information portion included in the panoramic image, instead of setting the target area to the entire close-up screen. This achieves security at each site while maintaining the sense of presence of the web conference.

Then, the transmission and reception unit 51 transmits the image processing setting file generated in step S37 to the communication terminal 7A (step S38). Thus, the transmission and reception unit 71A of the communication terminal 7A receives the image processing setting file transmitted by the image management apparatus 5. The image processing setting file at this time includes screen data on which no processing is performed to be displayed on the communication terminal 7B at the remote site.

Then, the transmission and reception unit 71A of the communication terminal 7 transmits the image processing setting file to the image capturing device 3 (step S39). Thus, the transmission and reception unit 31 of the image capturing device 3 receives the image processing setting file transmitted by the communication terminal 7A.

Then, the operation receiving unit 32 of the image capturing device 3 receives a display mode switching operation, and the display control unit 34 performs a display mode switching process (step S40).

Then, the generation unit 37 generates an image corresponding to the display mode (step S41). Specifically, the generation unit 37 performs image processing based on the setting information program received in step S39 and the selected display mode on unprocessed image data in cooperation with the calculation processing unit 36 to generate preview screen data. More specifically, the generation unit 37 generates preview screen data representing a preview screen of a processed image obtained by performing predetermined processing on a captured image, which can be displayed on the remote site terminal (communication terminal 7B) used at the remote site where the captured image of the local site is shared, on the basis of a predetermined display mode and the image processing setting file for performing the predetermined processing on the captured image. In other words, the generation unit 37 performs, as the predetermined processing, a process of blurring the entire captured image or a particular area of the captured image. The generation unit 37 performs the blurring processing on the panoramic image of 360-degree surroundings around the image capturing device and generates close-up images obtained by closing up predetermined areas such as a display area of a talker or a display area of an e interactive whiteboard apparatus in the panoramic image on which blurring processing is performed, to generate the preview screen data including the panoramic image on which the blurring processing is performed and the close-up image on which the blurring processing is performed.

Then, the transmission and reception unit 31 transmits the preview screen data to the communication terminal 7A using the UVC protocol (step S42). Thus, the transmission and reception unit 71A of the communication terminal 7A receives the preview screen data transmitted by the image capturing device 3. In other words, the transmission and reception unit 31 transmits the preview screen data to the local site terminal (communication terminal 7A) such that the preview screen is displayed on the remote site terminal (communication terminal 7B).

Subsequently, the transmission and reception unit 71A of the communication terminal 7A transmits the preview screen data to the communication terminal 7B (step S43). Thus, transmission and reception unit 71B of the communication terminal 7B receives the preview screen data transmitted by the communication terminal 7A. Specifically, the communication terminal 7A transmits the preview screen data, which is the result obtained by performing the predetermined processing and received from the image capturing device 3 connected to the communication terminal 7A, to the communication terminal 7B (an example of the remote site terminal) via the teleconference application installed on the communication terminal 7A such that the preview screen data is displayed on the communication terminal 7B.

In the image display system according to the present embodiment, for example, when the processes of steps S33 and S38 described above are performed, another apparatus may reside between the communication terminal 7A at the local site and the image management apparatus 5. In other words, various information or data exchanged between the communication terminal 7A at the local site and the image management apparatus 5 may be exchanged via another apparatus. The above-described configuration can be applied even when another or other processing steps are performed between the communication terminal 7A at the local site and the image management apparatus 5.

Figure 22:
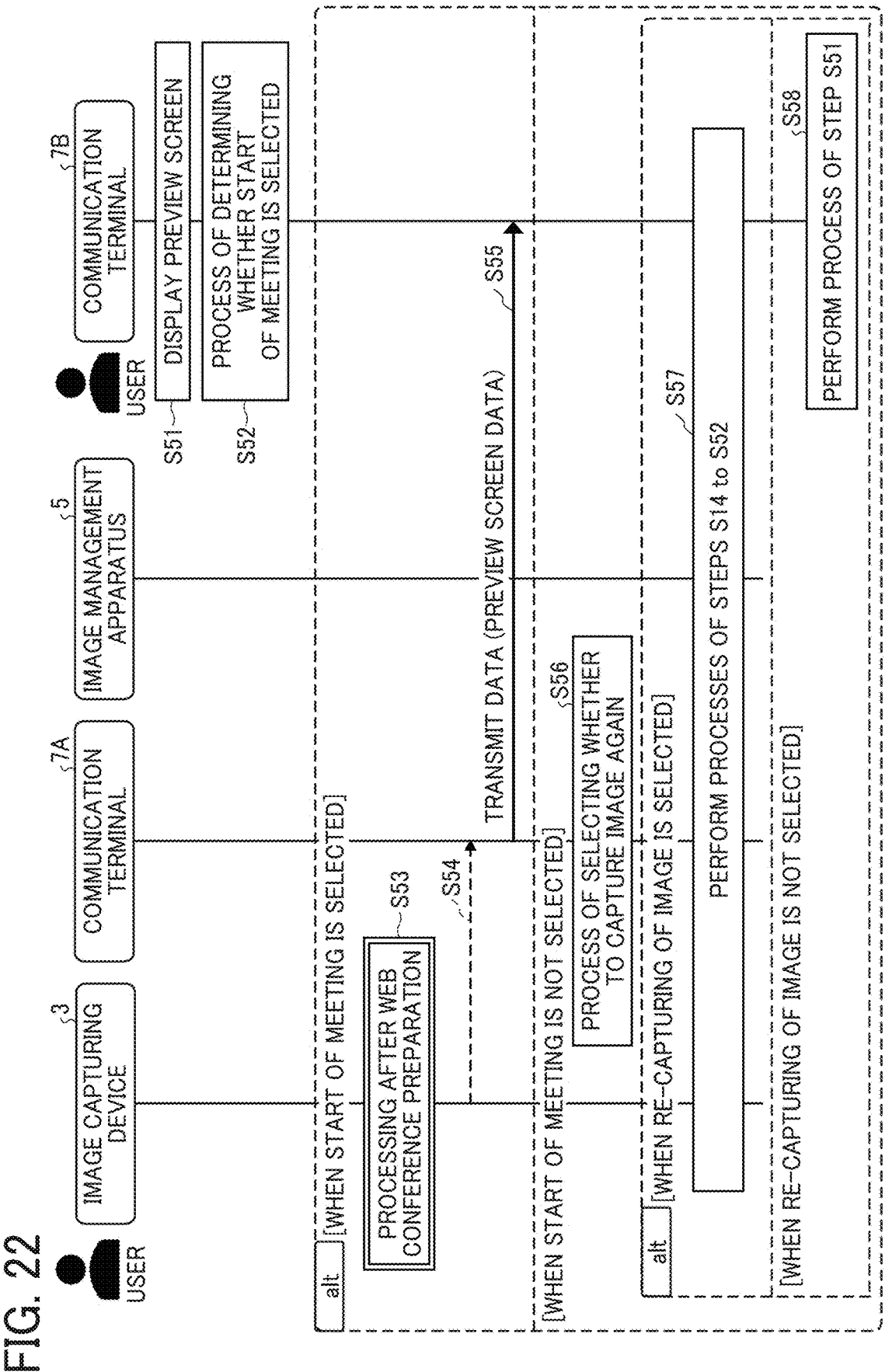
FIG. 22 is an example of a sequence diagram including a process after displaying a preview screen, according to an embodiment.

FIG. 22 is an example of a sequence diagram including processes after displaying the preview screen, according to an embodiment. In response to the process of step S43, the communication terminal 7B at the remote site displays the preview screen data (step S51). Specifically, the display control unit 34B of the communication terminal 7B controls the display 707 to display the preview screen represented by the preview screen data received in step S43.

A described is now given of processes performed after the start of a conference. The operation receiving unit 72B of the communication terminal 7B perform a process of determining whether a conference start is selected (step S52).

Processing After Start of Web Conference Start: When Start of Conference is Selected When the start of the conference is selected, the image display system 1 performs the following processes as processing to be performed after the start of the conference. First, the image capturing device 3 performs processing after the preparation for the web conference (step S53). A detailed description is now given of the details of this processing.

Details of Processing After Preparation for Web Conference

Figure 23:
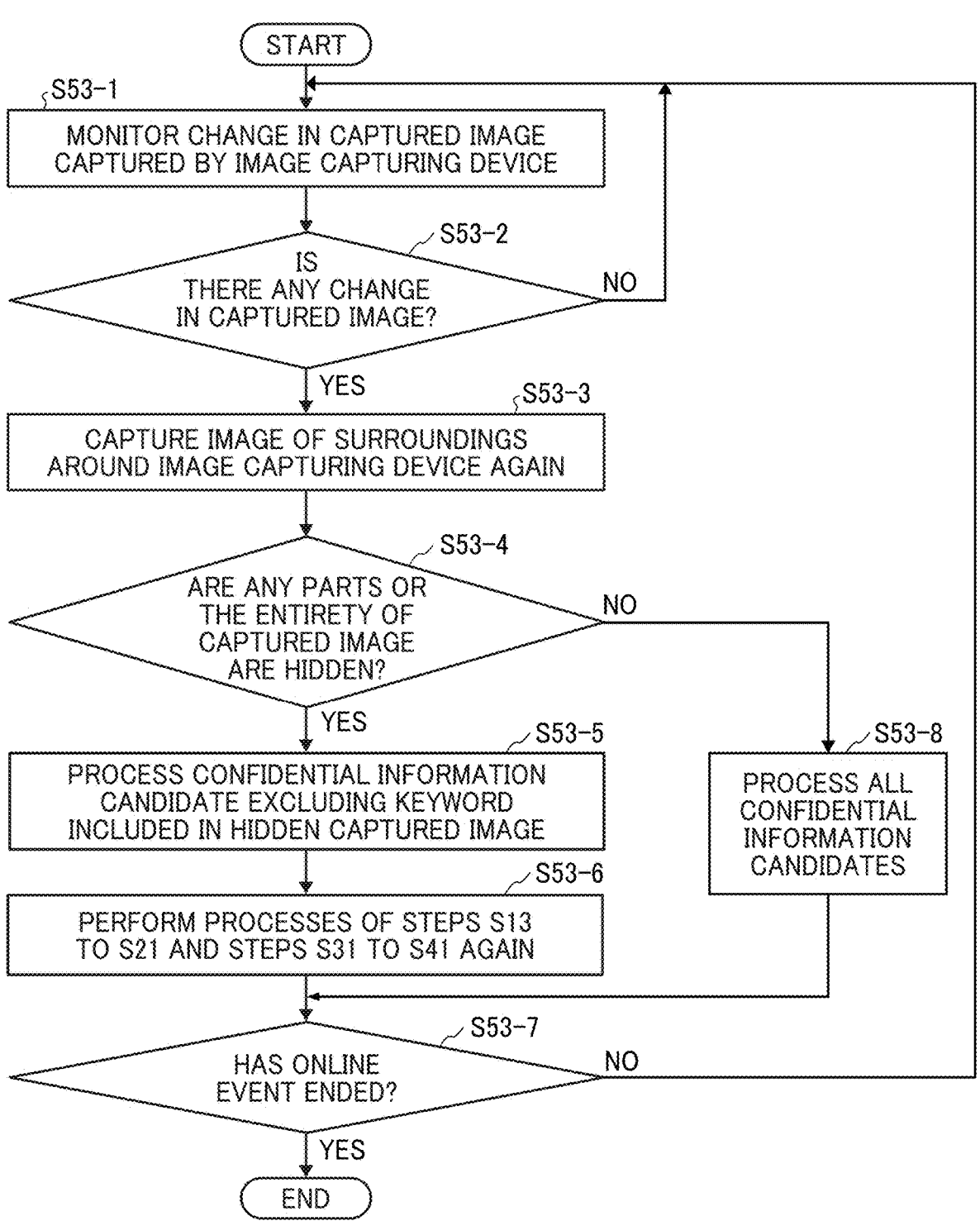
FIG. 23 is a flowchart illustrating an example of an operation performed after the preparation for a web conference, according to an embodiment.

FIG. 23 is a flowchart illustrating an example of an operation performed after the preparation for a web conference, according to an embodiment. First, the image capturing unit 33 of the image capturing device 3 monitors a change in a captured image being captured by the image capturing device 3 (step S53-1). Specifically, the image capturing unit 33 drives the imaging unit 301, the image processor 304, and the imaging controller 305 of the image capturing device 3 to monitor whether there is a change in the surrounding situation based on which the captured image of the local site is generated. The monitoring may be performed at any desired time and for any desired length, for example, every five seconds.

Then, the determination unit 35 determines whether there is a change in the captured image (step S53-2). Specifically, the determination unit 35 compares the surrounding situation (image to be captured) at the local site monitored, for example, five seconds ago with the current surrounding situation (image to be captured) at the local site to determine whether there are any differences.

When the determination result indicates that there is no change in the captured image (step S53-2: NO), the determination unit 35 performs the process of step S53-1 again.

When the determination result indicates that there is a change in the captured image (step S53-2: YES), the image capturing unit 33 captures the surroundings of the image capturing device 3 again and acquires a captured image of the local site (step S53-3).

Then, the determination unit 35 determines whether the captured image is partially or entirely hidden (step S53-4).

When the determination unit 35 determines that a part or the entirety of the captured image is hidden (step S53-4: YES), the calculation processing unit 36 processes a confidential information candidates excluding a keyword included in the hidden part of the captured image (step S53-5). Specifically, for example, when the captured-image data including a confidential information candidate is hidden by a participant participating in the online event and the confidential information candidate is unviewable or unreadble, the determination unit 35 determines that a part or the entirety of the captured image is hidden. On the basis of such a determination result, the calculation processing unit 36 processes a confidential information candidate excluding a keyword included in the hidden part of the captured image.

Subsequently, the image capturing device 3 performs the processes of steps S13 to S21 and S31 to S41 described above again (step S53-6).

Then, the determination unit 35 determines whether the online event ends (step S53-7). When the determination unit 35 determines that the online event ends (step S53-7: YES), the operation ends. When the determination unit 35 determines that the online event does not end (step S53-7: NO), the operation returns to the process of step S53-1.

By contrast, when the determination unit 35 determines that no part of the captured image is hidden (step S53-4: NO), the calculation processing unit 36 processes all the confidential information candidates (step S53-8), and the operation proceeds to the determination of the end of the online event by the determination unit 35 in step S53-7.

As described above, the image capturing device 3 monitors a change in the image as a background. In a case where there is a change in the background image during a time period when the online event is being conducted, the image capturing device 3 captures the surroundings around the image capturing device again to acquire a captured image, and transmits the captured image to the image management apparatus 5 via the communication terminal 7A. Subsequently, the communication terminal 7A requests the image management apparatus 5 to search for confidential information, and the image management apparatus 5 performs the confidential information determination again. Accordingly, for example, even in a case where confidential information is added to the whiteboard used during the online event, the confidential information determination is performed again, and the display content can be changed according to the determination result.

Referring again to FIG. 22, the transmission and reception unit 31 of the image capturing device 3 transmits the preview screen data to the communication terminal 7B using the UVC protocol (step S54). Thus, the transmission and reception unit 71A of the communication terminal 7A receives the preview screen data transmitted by the image capturing device 3.

Then, the transmission and reception unit 71A of the communication terminal 7A transmits the preview screen data to the communication terminal 7B (step S55). Thus, transmission and reception unit 71B of the communication terminal 7B receives the preview screen data transmitted by the communication terminal 7A. With the processes, the communication terminal 7B can display the preview screen data edited (processed) by the image capturing device 3 on the display 707.

Processing After Start of Web Conference Start: When Start of Conference is Not Selected By contrast, when the start of the conference is not selected in the process of determining whether the conference start is selected in step S52, the communication terminal 7A performs processing of determining whether capturing an image again is requested (step S56). Specifically, the display control unit 74A of the communication terminal 7A controls the display 707 to display a re-imaging request selection screen for selecting whether to request re-imaging.

When the re-imaging request is selected, the image display system 1 performs the above-described processes of steps S14 to S52 again (step S57).

By contrast, when the re-imaging request is not selected, the communication terminal 7B performs the above-described process of step S51 of displaying the preview screen again (step S58). The determination of whether the re-imaging request is selected may be performed after the elapse of a predetermined time period after the process of the selection of the conference start.

Example of Processing Performed on Captured Image to be Displayed on Communication Terminal at Remote Site A description is now given of an example of processing to be performed on a captured image to be displayed on the communication terminal 7 at the remote site. Specifically, a change in the screen displayed on the communication terminal 7 at the remote site when the process of step S53-3 is included is described.

Example of Display Screen

Figure 24A:
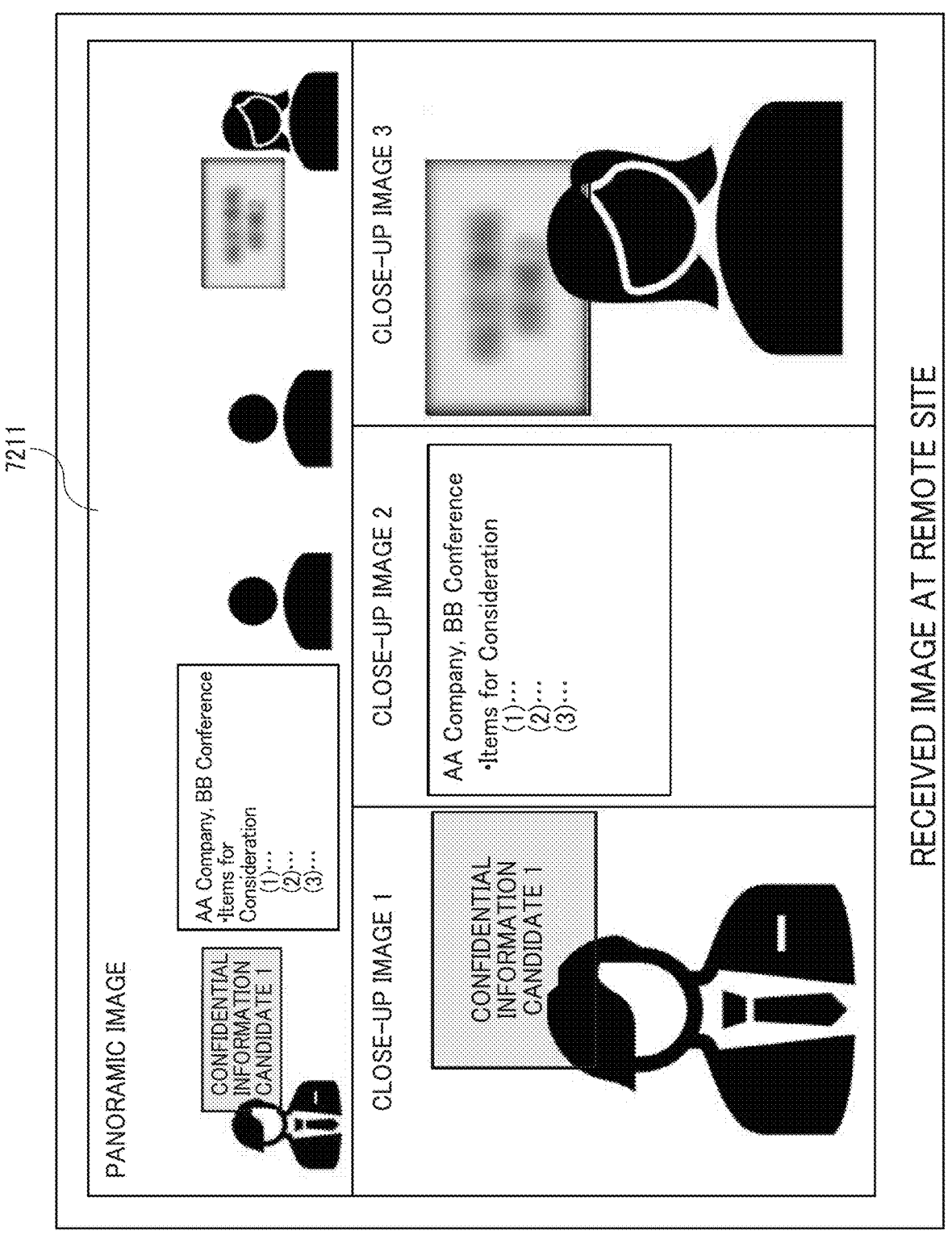
FIG. 24A is a diagram illustrating an example of a reception screen at a remote site, according to an embodiment.

FIG. 24A is a diagram illustrating an example of a reception screen at the remote site, according to an embodiment. In FIG. 24A, the display control unit 74B of the communication terminal 7B displays a reception screen 7211 on the display 707. On the reception screen 7211, the "blurring processing" is performed on the "confidential information candidate 2" in the close-up image 3. At this time, the "blurring processing" is performed also on the "confidential information candidate 2" in the close-up image 3 in the panoramic image.

Example of Display Screen

Figure 24B:
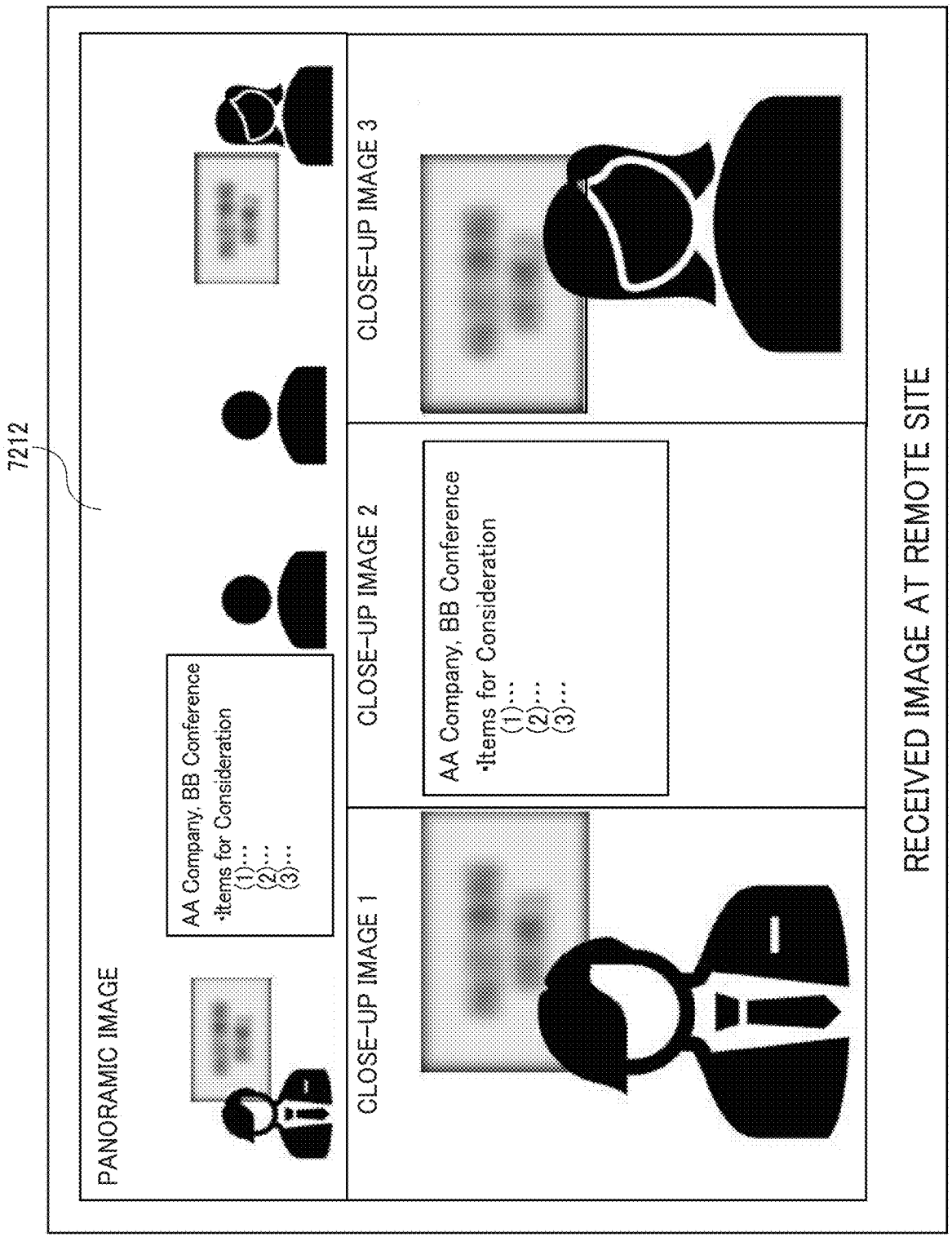
FIG. 24B is a diagram illustrating another example of a reception screen at a remote site, according to an embodiment.

FIG. 24B is a diagram illustrating another example of the reception screen at the remote site, according to an embodiment. In FIG. 24B, the display control unit 74B of the communication terminal 7B displays a reception screen 7212 on the display 707. Compared with the reception screen 7211, the "blurring processing" is additionally performed on a "confidential information candidate" in the close-up image 1 on the reception screen 7212. At this time, the "blurring processing" is performed also on the "confidential information candidate" in the close-up image 1 in the panoramic image.

Example of Display Screen

Figure 24C:
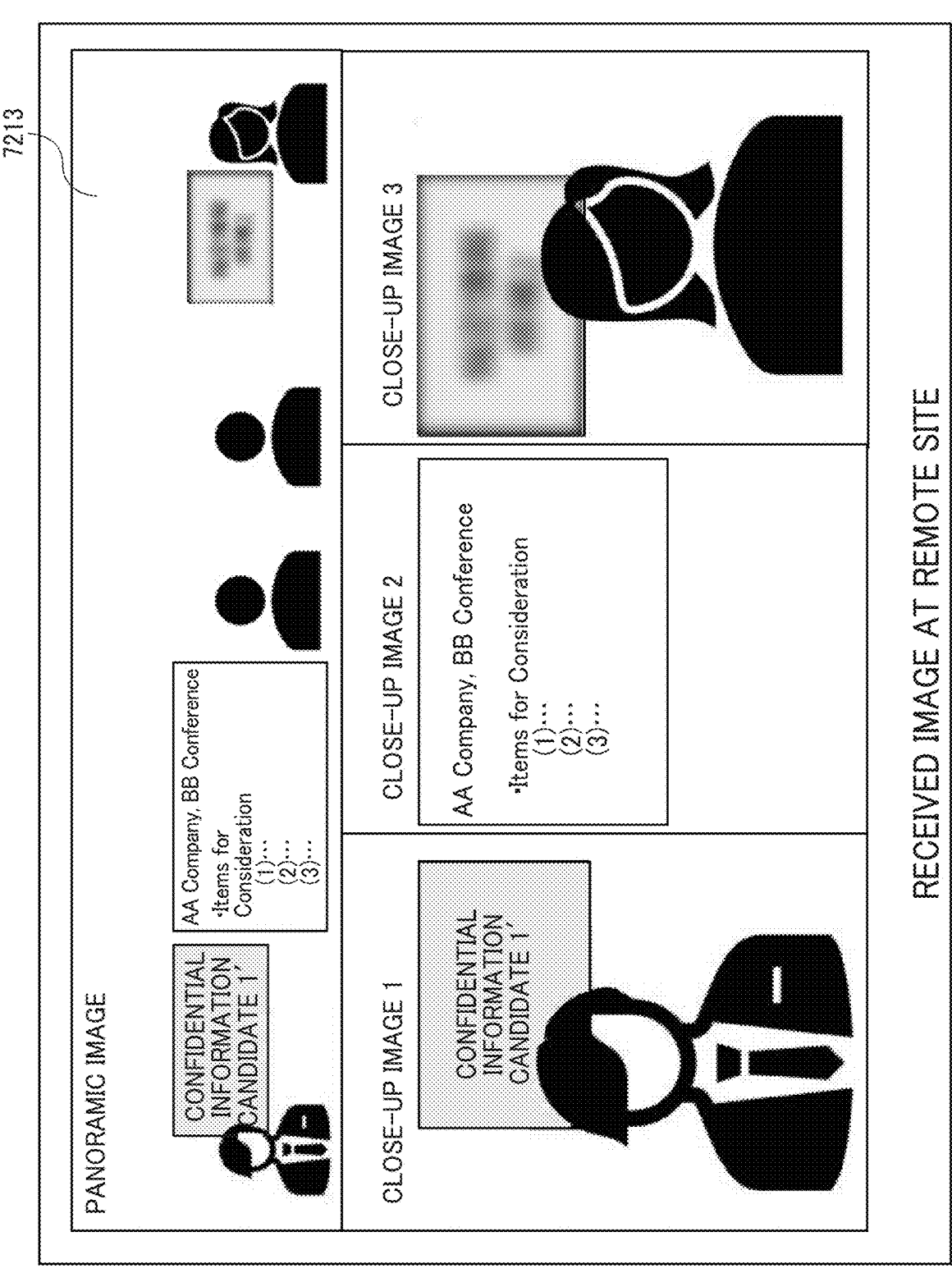
FIG. 24C is a diagram illustrating another example of a reception screen at a remote site, according to an embodiment.

FIG. 24C is a diagram illustrating another example of the reception screen at the remote site, according to an embodiment. In FIG. 24C, the display control unit 74B of the communication terminal 7B displays a reception screen 7213 on the display 707. Compared with the reception screen 7212, the "blurring processing" on the "confidential information candidate'" in the close-up image 1 is cancelled on the reception screen 7213 because the result of the confidential information determination for the "confidential information candidate'" is changed to a result that the "confidential information candidate'" is not confidential information any more.

Example of Display Screen

Figure 24D:
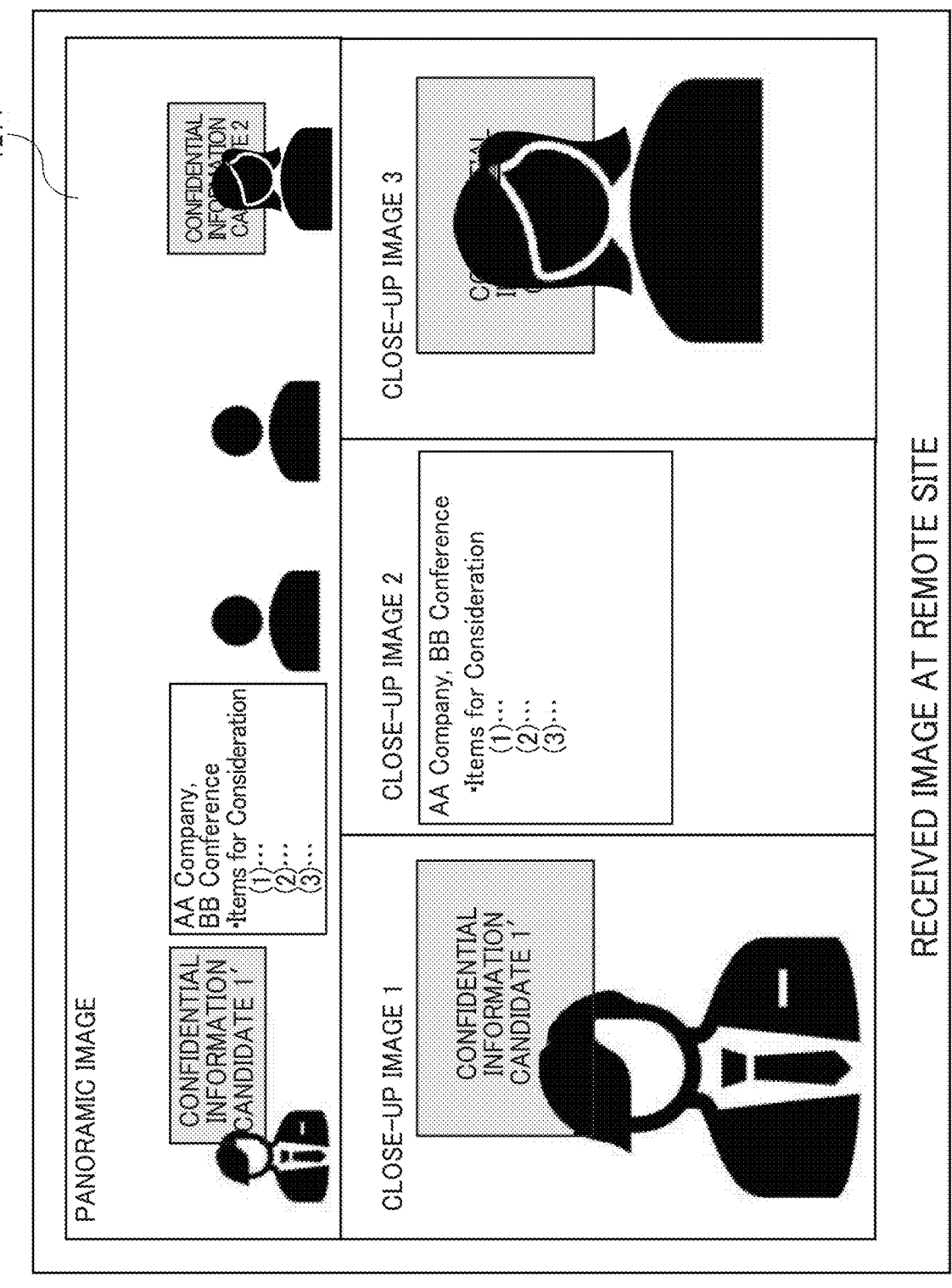
FIG. 24D is a diagram illustrating another example of a reception screen at a remote site, according to an embodiment.

FIG. 24D is a diagram illustrating another example of the reception screen at the remote site, according to an embodiment. In FIG. 24D, the display control unit 74B of the communication terminal 7B displays a reception screen 7214 on the display 707. On the reception screen 7214, the "confidential information candidate 2" in the close-up image 3 is hidden by the participant's head. This illustrates a case where the confidential information determination cannot be performed on the "confidential information candidate 2" or that the result of the confidential information determination indicates that the candidate is not confidential information. Accordingly, the "blurring processing" is not performed on the "confidential information candidate 2" in the close-up image 3 and the "confidential information candidate 2" is displayed as it is. In other words, even when the content of the confidential information candidate corresponds to confidential information, if the information is covered or hidden, processing such as the "blurring processing" may not be performed. Thus, an online event is continued with greater sense of presence.

As described above, according to the present embodiment, the image capturing device 3 captures an image of surroundings around the image capturing device to acquire a captured image of the local site (S14), receive a setting of a predetermined display mode for displaying the captured image (S40), generates the preview screen data representing a preview screen of a processed image obtained by performing predetermined processing on the captured image, which can be displayed on the remote site terminal (communication terminal 7B) used at the remote site where the captured image of the local site is shared, on the basis of a predetermined display mode and the image processing setting file for performing the predetermined processing on the captured image (S41), and transmits the preview screen data to the local site terminal (communication terminal 7A) so that the preview screen is displayed on the remote site terminal (communication terminal 7B) (S42). Accordingly, when a captured image of the local site is to be shared with a remote site, a processed screen obtained by performing processing on the captured image as needed is provided for the remote site.

Further, according to the present embodiment, the image capturing device 3 minimizes an area on which processing is performed as much as possible by setting a target area to only the confidential information portion included in the panoramic image, instead of setting the target area to the entire close-up screen, using the setting information program. This achieves security at each site while maintaining the sense of presence of an online event such as a web conference.

Further, according to the present embodiment, even in a case where confidential information is added to the whiteboard used during the online event, the confidential information determination is performed again, and the display content can be changed according to the determination result.

In the related art, when a captured image of a local site is to be shared with a remote site, it is difficult to provide the remote site with a processed screen obtained by performing a certain processing on the captured image as needed.

According to one aspect of the present disclosure, when a captured image of a local site is to be shared with a remote site, a processed screen obtained by performing processing on the captured image as needed is provided for the remote site.

Each of the functions according to the described embodiment can be implemented by one or more processing circuits or circuitry. The "processing circuit or circuitry" in the present disclosure includes a device programmed to execute each function by software, such as a processor implemented by an electronic circuit. The device may be, for example, a processor, an application specific integrated circuit (ASIC) designed to perform the functions described above, a digital signal processor (DSP), a field programmable gate array (FPGA), a system on a chip (SOC), a graphics processing unit (GPU), or a conventional circuit module.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

In the above-described embodiment, the image display system 1 may perform various determinations in the above described processes by machine learning such as an artificial intelligence (AI). This eliminates the need to use a corresponding data table.

In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method may be applied to machine learning. For example, any one of supervised learning, unsupervised learning, semi-supervised learning, reinforcement learning, and deep learning may be applied to machine learning. Further, a combination of two or more those learning may be applied to machine learning.

Although the image management system, the image capturing device, the imaging processing method, and the program according to an embodiment of the present disclosure are described, the above-described embodiment is illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Aspects of the present disclosure are, for example, as follows.

Aspect 1

According to Aspect 1, the image capturing device 3 (an example of an image capturing device) of the image management system 2 (an example of an image management system) includes the image capturing unit 33 (an example of image capturing means) to capture an image of the surroundings of the image capturing device 3 to acquire a captured image of a local site. The image capturing device 3 includes the operation receiving unit 32 (an example of receiving means) to receive a setting of a particular display mode for displaying the captured image. The image capturing device 3 includes the generation unit 37 (an example of preview screen data generating means) to generate preview screen data representing a preview screen of a processed image obtained by performing predetermined processing on the captured image, which can be displayed at the communication terminal 7B (an example of a remote site terminal) used at a remote site where the captured image of the local site is shared, on the basis of the particular display mode and an image processing setting file for performing the predetermined processing on the captured image. The image capturing device 3 includes the transmission and reception unit 31 (an example of preview screen data transmitting means) to transmit the generated preview screen data such that the preview screen is displayed at the communication terminal 7B.

According to Aspect 1, in a case where the captured image of the local site is to be shared with the remote site, a processed screen obtained by performing the predetermined processing on the captured image as needed is provided for the remote site.

Aspect 2

According to Aspect 2, the image management system 2 of Aspect 1 further includes the image management apparatus 5 (an example of an image management apparatus). The image management apparatus 5 includes the transmission and reception unit 51 (an example of captured-image related information receiving means) to receive captured-image related information relating to the captured image of the local site captured by the image capturing device 3. The image management apparatus 5 includes the generation unit 57 (an example of image processing setting file generating means) to generate the image processing setting file on the basis of particular keyword information included in the captured-image related information. The image management apparatus 5 includes the transmission and reception unit 51 (an example of image processing setting file transmitting means) to transmit the generated image processing setting file such that the image capturing device 3 sets the image processing setting file.

According to Aspect 2, the same effect as Aspect 1 is attained.

Aspect 3

According to Aspect 3, the image management system 2 of Aspect 2 further includes the communication terminal 7A (an example of a local site terminal) used at the local site. The communication terminal 7A includes the transmission and reception unit 71A (an example of transmitting means) to transmit the image processing setting file transmitted by the image management apparatus 5 to the image capturing device 3.

According to Aspect 3, the same effect as Aspect 1 is attained.

Aspect 4

According to Aspect 4, in the image management system 2 of any one of Aspects 1 to 3, the image processing setting file is a setting file for performing predetermined processing of concealing confidential information included in the captured image.

According to Aspect 4, the same effect as Aspect 1 is attained.

Aspect 5

According to Aspect 5, in the image management system 2 of any one of Aspects 2 to 4, the generation unit 57 of the image management apparatus 5 generates the image processing setting file on the basis of the particular keyword information and the presence of a non-disclosure agreement between the local site and the remote site.

According to Aspect 5, in addition to the effect attained by Aspect 1, the remote site is provided with a processed screen obtained by performing the predetermined processing on information relating to the non-disclosure agreement.

Aspect 6

According to Aspect 6, in the image management system 2 of any one of Aspects 1 to 5, the image capturing unit 33 of the image capturing device 3 captures the surroundings of the image capturing device 3 again to acquire a re-captured image of the local site in a case where there is a change between the captured image of the local site and an image of the local site after an elapse of a predetermined time period.

According to Aspect 6, in addition to the effect attained by Aspect 1, even in a case where confidential information is added to the captured-image data, the confidential information determination is performed again, and the display content is changed according to the determination result.

Aspect 7

According to Aspect 7, in the image management system 2 of any one of Aspects 3 to 6, the image capturing device 3 further includes the calculation processing unit 36 (an example of distance measuring means) to measure a distance between the image capturing device 3 and a subject to be imaged by the image capturing device 3, and the transmission and reception unit 31 adds distance information indicating the distance to the preview screen data and transmits the preview screen data to which the distance information is added to the communication terminal 7A.

According to Aspect 7, by changing whether to perform the predetermined processing according the distance between the captured-image data as a part of the subject and the image capturing device 3, the predetermined processing is prevented from being unnecessarily performed, and thus a screen with greater sense of presence is provided.

Aspect 8

According to Aspect 8, in the image management system 2 of Aspect 7, the transmission and reception unit 31 of the image capturing device 3 adds resolution information indicating performance of the image capturing device 3 to the preview screen data and transmits the preview screen data to which the resolution information is added to the communication terminal 7A.

According to Aspect 8, in addition to the effect attained by Aspect 7, by performing processing according to the performance of the image capturing device 3, a screen with greater sense of presence is provided while utilizing the performance of the image capturing device 3.

Aspect 9

According to Aspect 9, in the image management system 2 of any one of Aspects 1 to 8, the generation unit 37 of the image capturing device 3 generates the preview screen data on which processing of blurring an entirety of the captured image or a particular part of the captured image is performed as the predetermined processing.

According to Aspect 9, in addition to the effect attained by Aspect 1, suitable processing is performed on information (captured-image data) to be concealed.

Aspect 10:

According to Aspect 10, in the image management system 2 of Aspect 9, the image capturing device 3 generates a panoramic image of 360 degrees around the image capturing device 3, and the preview screen data generating means performs the processing of blurring on the panoramic image and generates a close-up image obtained by closing up a particular area of the panoramic image on which the processing of blurring is performed to generate the preview screen data including the panoramic image on which the processing of blurring is performed and the close-up image on which the processing of blurring is performed.

According to Aspect 10, as in the Aspect 9, suitable processing is performed on information (captured-image data) to be concealed.

Aspect 11

According to Aspect 11, in the image management system of any one of Aspects 3 to 10, the communication terminal 7 is a communication terminal including a teleconference application, the communication terminal 7 includes a PC or the interactive whiteboard apparatus, and the communication terminal 7A transmits the preview screen data, which is a result obtained by performing the predetermined processing received from the image capturing device 3 connected to the communication terminal 7A, to the communication terminal 7B (an example of the remote site terminal) via the teleconference application such that the preview screen data is displayed on the communication terminal 7B.

According to Aspect 11, even in a case where, for example, a PC or an interactive whiteboard apparatus is used, when the captured image of the local site is shared with the remote site, the local site is provided with a processed screen obtained by performing the predetermined processing as needed.

Aspect 12

According to Aspect 12, the image capturing device 3 (an example of an image capturing device) includes the image capturing unit 33 (an example of image capturing means) to capture an image of the surroundings of the image capturing device 3 to acquire a captured image of a local site. The image capturing device 3 includes the operation receiving unit 32 (an example of receiving means) to receive a setting of a particular display mode for displaying the captured image. The image capturing device 3 includes the generation unit 37 (an example of preview screen data generating means) to generate preview screen data representing a preview screen of a processed image obtained by performing predetermined processing on the captured image, which can be displayed at the communication terminal 7B (an example of a remote site terminal) used at a remote site where the captured image of the local site is shared, on the basis of the particular display mode and an image processing setting file for performing the predetermined processing on the captured image. The image capturing device 3 includes the transmission and reception unit 31 (an example of preview screen data transmitting means) to transmit the generated preview screen data such that the preview screen is displayed at the communication terminal 7B.

According to Aspect 12, as in Aspect 1, in a case where the captured image of the local site is to be shared with the remote site, a processed screen obtained by performing the predetermined processing on the captured image as needed is provided for the remote site.

Aspect 13

According to Aspect 13, an imaging processing method performed by the image capturing device 3 (an example of an image capturing device) includes capturing an image of the surroundings of the image capturing device 3 to acquire a captured image of a local site. The imaging processing method includes receiving a setting of a particular display mode for displaying the captured image. The imaging processing method includes generating preview screen data representing a preview screen of a processed image obtained by performing predetermined processing on the captured image, which can be displayed at the communication terminal 7B (an example of a remote site terminal) used at a remote site where the captured image of the local site is shared, on the basis of the particular display mode and an image processing setting file for performing the predetermined processing on the captured image. The imaging processing method includes transmitting the generated preview screen data such that the preview screen is displayed at the communication terminal 7B.

According to Aspect 13, as in Aspect 1, in a case where the captured image of the local site is to be shared with the remote site, a processed screen obtained by performing the predetermined processing on the captured image as needed is provided for the remote site.

Aspect 14

According to Aspect 14, a program causes the image capturing device 3 (an example of an image capturing device) to perform an operation. The operation includes capturing an image of the surroundings of the image capturing device 3 to acquire a captured image of a local site. The operation includes receiving a setting of a particular display mode for displaying the captured image. The operation includes generating preview screen data representing a preview screen of a processed image obtained by performing predetermined processing on the captured image, which can be displayed at the communication terminal 7B (an example of a remote site terminal) used at a remote site where the captured image of the local site is shared, on the basis of the particular display mode and an image processing setting file for performing the predetermined processing on the captured image. The operation includes transmitting the generated preview screen data such that the preview screen is displayed at the communication terminal 7B.

According to Aspect 14, as in Aspect 1, in a case where the captured image of the local site is to be shared with the remote site, a processed screen obtained by performing the predetermined processing on the captured image as needed is provided for the remote site.

The invention claimed is:

1. An image management system comprising:
   an image capturing device, the image capturing device including first circuitry configured to:
   acquire a captured image of a local site of the image capturing device, the captured image being an image of surroundings around the image capturing device;
   receive a setting of a particular display mode in which the captured image is to be displayed;
   generate preview screen data representing a preview screen of a processed image obtained by performing predetermined processing on the captured image, based on the particular display mode and an image processing setting file for performing the predetermined processing on the captured image; and
   transmit the preview screen data for display at a first terminal at another site where the captured image of the local site is shared, and
   an image management apparatus including second circuitry configured to:
   receive captured-image related information relating to the captured image of the local site;
   generate the image processing setting file based on particular keyword information included in the captured-image related information; and
   transmit the generated image processing setting file, the image processing setting file being set at the image capturing device.

2. The image management system of claim 1, further comprising:
   a second terminal at the local site, the second terminal including third circuitry configured to transmit the image processing setting file transmitted by the image management apparatus to the image capturing device.

3. The image management system of claim 2, wherein the first circuitry of the image capturing device is further configured to:
   measure a distance between the image capturing device and a subject to be imaged by the image capturing device;
   add distance information indicating the distance to the preview screen data; and
   transmit the preview screen data to which the distance information is added to the second terminal.

4. The image management system of claim 3, wherein the first circuitry of the image capturing device is configured to:
add resolution information indicating performance of the image capturing device to the preview screen data; and transmit the preview screen data to which the resolution information is added to the second terminal.

5. The image management system of claim 2, wherein;
   the second terminal is a communication terminal installed with a teleconference application and connected to the image capturing device via a network, the communication terminal being a personal computer or an interactive whiteboard apparatus, and
   the third circuitry of the communication terminal being configured to execute the teleconference application to receive the preview screen data from the image capturing device, and transmit the preview screen data, which is a result obtained by performing the predetermined processing, to the first terminal for display at the first terminal.

6. The image management system of claim 1, wherein;
   the image processing setting file is a setting file for performing the predetermined processing for concealing confidential information included in the captured image.

7. The image management system of claim 1, wherein;
   the second circuitry of the image management apparatus is configured to generate the image processing setting file based on the particular keyword information and an indication of whether a non-disclosure agreement is concluded between an entity at the local site and another entity at said another site.

8. The image management system of claim 1, wherein;
   the first circuitry of the image capturing device is further configured to instruct capturing of the surroundings around the image capturing device again to acquire a re-captured image of the local site in a case where there is a change between the captured image of the local site and an image of the local site after an elapse of a predetermined time period.

9. The image management system of claim 1, wherein;
   the first circuitry of the image capturing device is configured to generate the preview screen data by performing processing of blurring on an entirety of the captured image or a particular part of the captured image as the predetermined processing.

10. The image management system of claim 9, wherein the first circuitry of the image capturing device is configured to:
   generate a panoramic image of 360 degrees around the image capturing device; and
   perform the processing of blurring on the panoramic image and generate a close-up image obtained by closing up a particular area of the panoramic image on which the processing of blurring is performed to generate the preview screen data including the panoramic image on which the processing of blurring is performed and the close-up image on which the processing of blurring is performed.

11. The image management system of claim 1, wherein:
   the image capturing device comprises a camera.

12. An imaging processing method, comprising:
   acquiring a captured image of a local site of an image capturing device, the captured image being an image of surroundings around the image capturing device;
   receiving a setting of a particular display mode in which the captured image is to be displayed;
   generating preview screen data representing a preview screen of a processed image obtained by performing predetermined processing on the captured image, based on the particular display mode and an image processing setting file for performing the predetermined processing on the captured image; and transmitting the preview screen data for display at a first terminal at another site where the captured image of the local site is shared;

receiving captured-image related information relating to the captured image of the local site;

generating the image processing setting file based on particular keyword information included in the captured-image related information; and transmitting the generated image processing setting file, the image processing setting file being set at the image capturing device.

13. A non-transitory computer-executable medium storing a plurality of instructions which, when executed by one or more processors, causes the one or more processors to perform the method of claim 12.

14. The image processing method of claim 12, wherein: the image processing setting file is a setting file for performing the predetermined processing for concealing confidential information included in the captured image.

15. The image processing method of claim 12, further comprising:

generating the image processing setting file based on the particular keyword information and an indication of whether a non-disclosure agreement is concluded between an entity at the local site and another entity at said another site.

16. The image processing method of claim 12, further comprising:

generating the preview screen data by performing processing of blurring on an entirety of the captured image or a particular part of the captured image as the predetermined processing.

17. An image management apparatus including circuitry configured to:

receive captured-image related information relating to a captured image which was captured at a local site by an image capturing device;

generate an image processing setting file based on particular keyword information included in the captured-image related information; and transmit the generated image processing setting file, the image processing setting file being set at the image capturing device.

18. The image management apparatus of claim 17, wherein:

the image processing setting file is a setting file for performing the predetermined processing for concealing confidential information included in the captured image.

19. The image management apparatus of claim 17, wherein:

the circuitry of the image management apparatus is further configured to generate the image processing setting file based on the particular keyword information and an indication of whether a non-disclosure agreement is concluded between an entity at the local site and another entity at said another site.

20. The image management apparatus of claim 17, wherein:

the image capturing device comprises a camera.

* * * * *